US008522192B1

(12) United States Patent
Avalos et al.

(10) Patent No.: US 8,522,192 B1
(45) Date of Patent: Aug. 27, 2013

(54) SYSTEMS AND METHODS FOR PERFORMING OPERATIONS IN A REPORTING SYSTEM

(75) Inventors: Rodolfo Avalos, Vienna, VA (US); Jeffrey A. Bedell, Arlington, VA (US); Scott Cappiello, Arlington, VA (US); Alejandro Freixas, Centreville, VA (US); Raul Gonzalez, Fairfax, VA (US); William Hurwood, Washington, DC (US); Benjamin Li, Great Falls, VA (US); Wenfeng Li, Reston, VA (US); Ningning Liu, Vienna, VA (US); Luis V. Orozco, Vienna, CA (US); Ramkumar Ramachandran, Reston, VA (US); Michael J. Saylor, Great Falls, VA (US); Stephen S. Trundle, Falls Church, VA (US); Abhimanyu Warikoo, New York, NY (US)

(73) Assignee: Microstrategy Incorporated, McLean, VA (US)

( * ) Notice: Subject to any disclaimer, the term of this patent is extended or adjusted under 35 U.S.C. 154(b) by 1938 days.

(21) Appl. No.: 10/175,328

(22) Filed: Jun. 20, 2002
(Under 37 CFR 1.47)

Related U.S. Application Data

(60) Provisional application No. 60/299,180, filed on Jun. 20, 2001.

(51) Int. Cl.
*G06F 9/44* (2006.01)
(52) U.S. Cl.
USPC ............ 717/100; 717/106; 717/110; 717/113

(58) Field of Classification Search
USPC .......................... 717/101–103; 715/733, 764
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,734,831 A * | 3/1998 | Sanders | 709/223 |
| 5,862,379 A * | 1/1999 | Rubin et al. | 717/109 |
| 5,864,856 A | 1/1999 | Young | |

(Continued)

OTHER PUBLICATIONS

Kheit, "GUI vs. CLI," Sep. 1998.*

(Continued)

*Primary Examiner* — Insun Kang
(74) *Attorney, Agent, or Firm* — Hunton & Williams

(57) ABSTRACT

A system and method for facilitating the performance of administrator tasks in performing changes to enterprise level data that is associated with various users. The method includes the steps of generating a login dialog box to accept login information from an administrator; establishing a connection to at least one project source name; providing an outline to the administrator, the outline facilitating the creation and submission of command based instruction by providing syntax for a purpose, the outline being maintained in a predetermined folder; and providing a history feature to save a set instructions that were executed successfully.

8 Claims, 14 Drawing Sheets

(56) References Cited

U.S. PATENT DOCUMENTS

| | | | |
|---|---|---|---|
| 5,914,878 A | 6/1999 | Yamamoto | |
| 6,002,871 A * | 12/1999 | Duggan et al. | 717/135 |
| 6,061,695 A * | 5/2000 | Slivka et al. | 715/203 |
| 6,154,766 A | 11/2000 | Yost | |
| 6,247,008 B1 | 6/2001 | Cambot | |
| 6,279,033 B1 | 8/2001 | Selvarajan | |
| 6,311,320 B1* | 10/2001 | Jibbe | 717/111 |
| 6,463,552 B1* | 10/2002 | Jibbe | 714/33 |
| 6,854,088 B2* | 2/2005 | Massengale et al. | 715/764 |
| 6,938,205 B1* | 8/2005 | Hanson et al. | 715/234 |
| 7,367,017 B2* | 4/2008 | Maddocks et al. | 717/115 |
| 2002/0178239 A1* | 11/2002 | Kinyon et al. | 709/220 |
| 2005/0210445 A1* | 9/2005 | Gough et al. | 717/111 |

OTHER PUBLICATIONS

Egenhofer, "Spatial SQL: A Query and Presentation Language," IEEE, 1994.*
Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.
Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.
Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.
Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.
Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.
Craig Warren Thompson, M.A., B.A., Using Menu-Based Natural Language Understanding to Avoid Problems Associated with Traditional Natural Language Interfaces to Databases, Dissertation Presented to the Faculty of the Graduate School of the University of Texas at Austin, May 1984.
Business Objects User's Guide Version 5.1 (electronic copy on enclosed CD).
Getting Started with Business Objects Version 5.1 (electronic copy on enclosed CD).
Business Objects Deployment Guide (electronic copy on enclosed CD).
Broadcast Agent 5.1 (electronic copy on enclosed CD).
Business Objects 5.1 (electronic copy on enclosed CD).
Web Intelligence 2.6 (electronic copy on enclosed CD).
Business Objects Designer's Guide Version 5.1 (electronic copy on enclosed CD).
Business Objects Error Message Guide Version 5.1 (electronic copy on enclosed CD).
Business Objects Generic ODBC Access Guide Version 5.1 (electronic copy on enclosed CD).
Business Objects Info View User's Guide (electronic copy on enclosed CD).
Business Objects Installation and Upgrade Guide(electronic copy on enclosed CD).
Business Objects MS Access Database Guide Version 5.1(electronic copy on enclosed CD).
Business Objects MS SQL Server Database Guide Version 5.1 (electronic copy on enclosed CD).
Business Objections Supervisor's Guide Version 5.1 (electronic copy on enclosed CD).
Quick Start MicroStrategy Agent Version 6.0 (electronic copy on enclosed CD).
User Guide MicroStrategy Agent Version 6.0 (electronic copy on enclosed CD).
User Guide MicroStrategy Architect Version 6.0 (electronic copy on enclosed CD).
User Guide MicroStrategy Objects Version 6.0 (electronic copy on enclosed CD.
Excel Add-In MicroStrategy Objects Version 6.0 (electronic copy on enclosed CD).
User Guide MicroStrategy Intelligence Server Version 6.0 (electronic copy on enclosed CD).
User Guide MicroStrategy Administrator Version 6.0 (electronic copy on enclosed CD).
Administrator Guide MicroStrategy Administrator Version 6.5 (electronic copy on enclosed CD).
Blum, Diamond, Hammon, Perkins, and Semmel, "An Intelligent Navigational Assistant for a Decision Resource Database," Proceedings of the Third Annual Expert Systems in Government Conference, pp. 19-25 (1987).
Blum (1988) = Blum, Semmel & Sigillio, "Navigating Through Complex Databases: A Case Study," Application of Artificial Intelligence to Command & Control Systems, pp. 380-396 (1988).
DataPrism1=1990 Brio DataPrism Reference Manual, Version 1.0 for Apple Macintosh Computers.
DataPrism2=1991 Brio DataPrism Reference Manual Update, Version 1.1 for Apple Macintosh Computers.
DataPrism3=1990 Brio DataPrism User's Guide, Version 1.1 Update for Apple Macintosh Computers.
DataPrism4=1991 Brio DataPrism Update, Version 1.7 for Apple Macintosh Computers.
Metaphor1=1987 Metaphor Query Tutorial.
Metaphor2=1988 Workstation Tools Training, Metaphor.
Metaphor3=1989 Metaphor Database Administration, Release 9.0.
Metaphor4=1989 Metaphor Database Administration DBA Tool.
Metaphor5=1990 Metaphor Query Tutorial.
SkipperSQL1=SkipperSQL 2.0 User's Manual (translation).
SkipperSQL2=SkipperSQL Database Administrator's Manual (translation).
SkipperSQL3=SkipperSQL 2.06 User's Manual.
SkipperSQL4=SkipperSQL 2.06 Infocenter Manager's Guide.
Bipin C. Desai et al., "A portable natural language interface," AFIPS Conference Proceedings, vol. 56, 1987, National Computer Conference, pp. 53-58.
Arthur J. Benjamin et al., "A visual Tool for Managing Relational Databases," IEEE Int. Conference on Data Engineering, 1986, pp. 661-668.
X. Wu et al., "KDA: A Knowledge-based Database Assistant," Proceedings Fifth International Conference on Data Engineering, 1989, pp. 402-409.
G. Jakobson et al., "An Intelligent Database Assistant," IEEE Expert, 1986, pp. 65-79.
Tadao Ichikawa et al., "ARES: A Relational Database with the Capability of Performing Flexible Interpretation of Queries," IEEE Transactions on Software Engineering, vol. SE-12, No. 5, May 1986, pp. 624-634.
I. Androutsopoulos et al., "Natural Language Interfaces to Databases—An Introduction," arXiv:cmp-lg/9503013, vol. 2, Mar. 16, 1995, pp. 1-50.
Eva M. Mueckstein, "Semantic interpretation of a database query language," Data & Knowledge Engineering 1, 1985, pp. 123-138.
S.L. Booth et al., "A Robust Natural Language Interface to a Decision Support System," Conference on Software Tools, 1985, pp. 229-236.
Richard Hull et al., "Semantic Database Modeling: Survey, Applications and Research Issues," ACM Computing Surveys, vol. 19, No. 3, Sep. 1987, pp. 201-260.
Michael D. Gould et al., "Spatial Decision Support Systems: A Bibliography," National Center for Geographic Information and Analysis, Technical Paper 919, Jun. 1991, 17 pages.

Max J. Egenhofer et al., "Query Languages for Geographic Information Systems," National Center for Geographic Information & Analysis, Report 90-12.

Ann Copestake et al., The Knowledge Engineering review, vol. 5, No. 4, Dec. 1990, "Natuaral language interfaces to databases," pp. 225-249.

Administrator Guide MicroStrategy Broadcast Server Version 6.0 (electronic copy on enclosed CD).

Programmers Reference and SDK Guide MicroStrategy Broadcast Server Version 6.0 (electronic copy on enclosed CD).

Administrator Guide MS Broadcast Server Version 6.6 (electronic copy on enclosed CD).

Programmer's Reference and SDK Guide MS Broadcast Server Version 6.6 (electronic copy on enclosed CD).

* cited by examiner

SYSTEMS AND METHODS FOR PERFORMING OPERATIONS IN A REPORTING SYSTEM

This application claims priority to and benefit of Provisional Patent Application Ser. No. 60/299,180, filed Jun. 20, 2001, the disclosure of which is incorporated by reference in its entirety.

FIELD OF THE INVENTION

The systems and methods of the invention relate to various operations in a reporting system, such as processing reports in a "reporting system," and in particular to features relating to cost estimation of reports in the reporting system, features relating to a command line interface in the reporting system, features relating to caching in the reporting system, and features relating to user authentication and user management in the reporting system.

SUMMARY OF THE INVENTION

The systems and methods of the invention relate to various operations in a reporting system, such as processing reports in a "reporting system." In particular, the systems and methods of the invention relate to the cost estimation of reports in the reporting system.

Additionally, features relating to a command line interface in the reporting system provides for command manager capabilities. These capabilities allow additions, deletions, or updates to enterprise-level data associated with the large numbers of users and user groups. The command manager in accordance with embodiment of the methods and systems of the invention provides various functions and capabilities related to a command manager graphical user interface (GUI), in accordance with one embodiment of the invention Further features relating to security aware caching in the reporting system is described. The systems and methods of the invention allow for caching, while maintaining desired security measures.

Further, the systems and methods of the invention provide various features relating to user authentication and user management in the reporting system.

DETAILED DESCRIPTION OF THE INVENTION

The present invention relates to systems and methods for various operations in a reporting system, such as processing reports in a "reporting system." As used herein, a "reporting system" may include an On-line Analytical Processing (OLAP) system, a business intelligence (BI) system or other reporting systems. For context in understanding the present invention, FIGS. 1 and 2 are shown that illustrate an embodiment of such a system for which the invention may be used.

Figure 1:
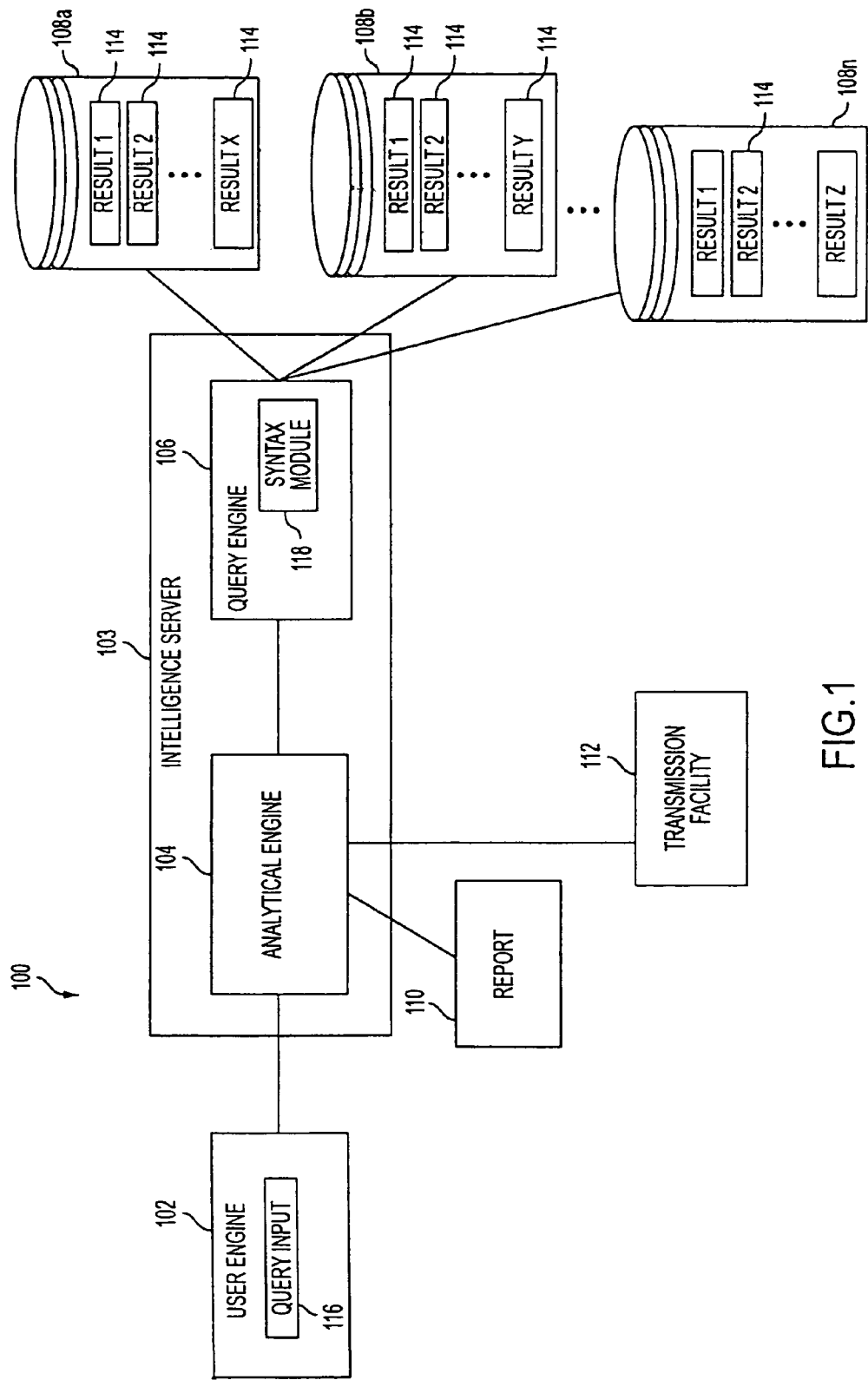
FIG. 1 illustrates a network architecture according to an embodiment of the invention.
Figure 2:
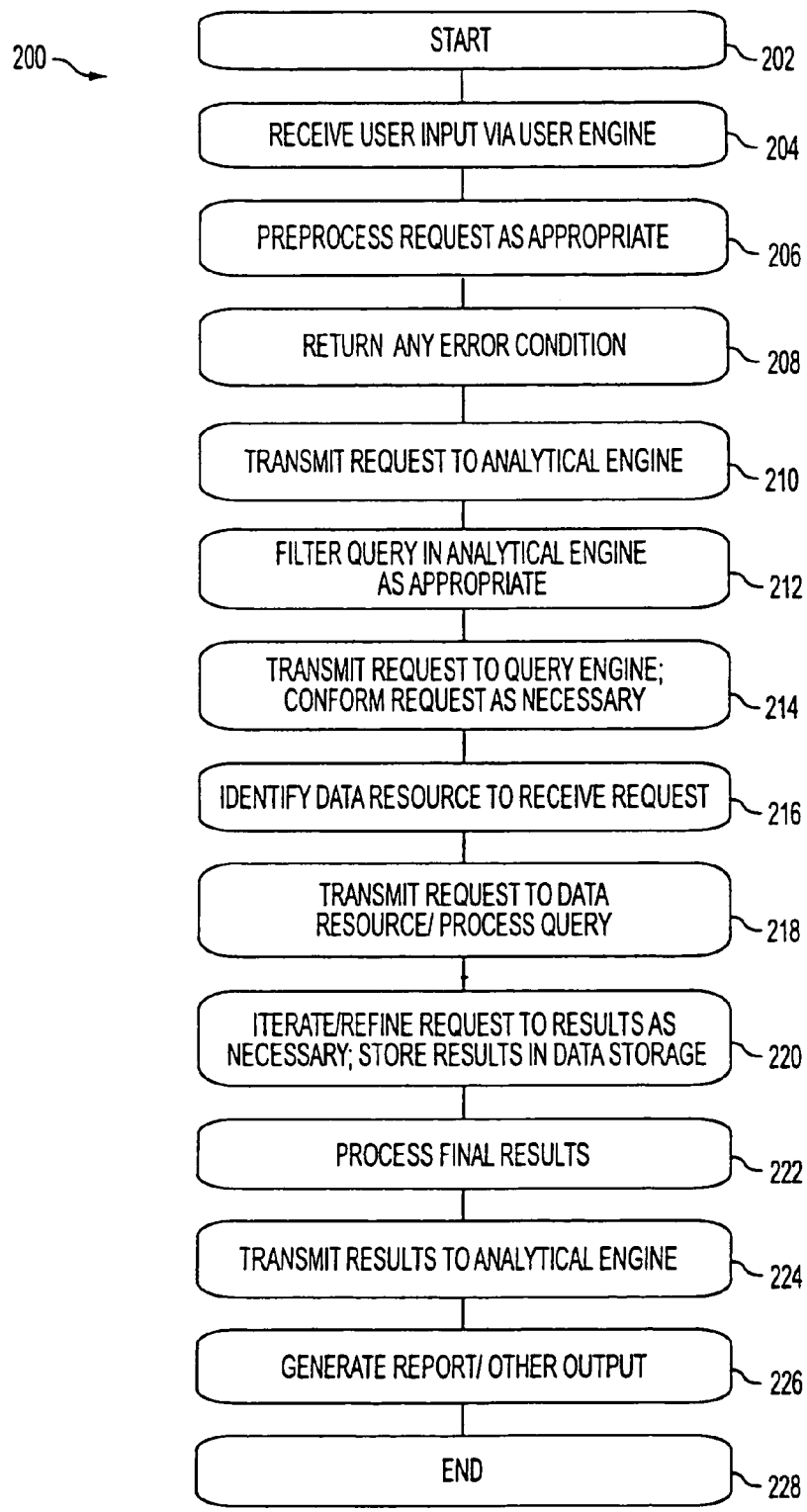
FIG. 2 illustrates a flowchart of query engine processing according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

A. Systems and Methods for Cost Estimation of Reports

Hereinafter, further aspects of the systems and methods of the invention will be described with reference to the analytical engine 104 and the report 110. That is, as described below, the invention will be described with reference to establishing priorities, based on cost estimation for example, among report jobs processed in the analytical engine 104, and for servicing those jobs within a processing unit. However, it should be appreciated that the priority schemes and techniques described herein could be used in any environment in which jobs are prioritized prior to processing.

Figure 3:
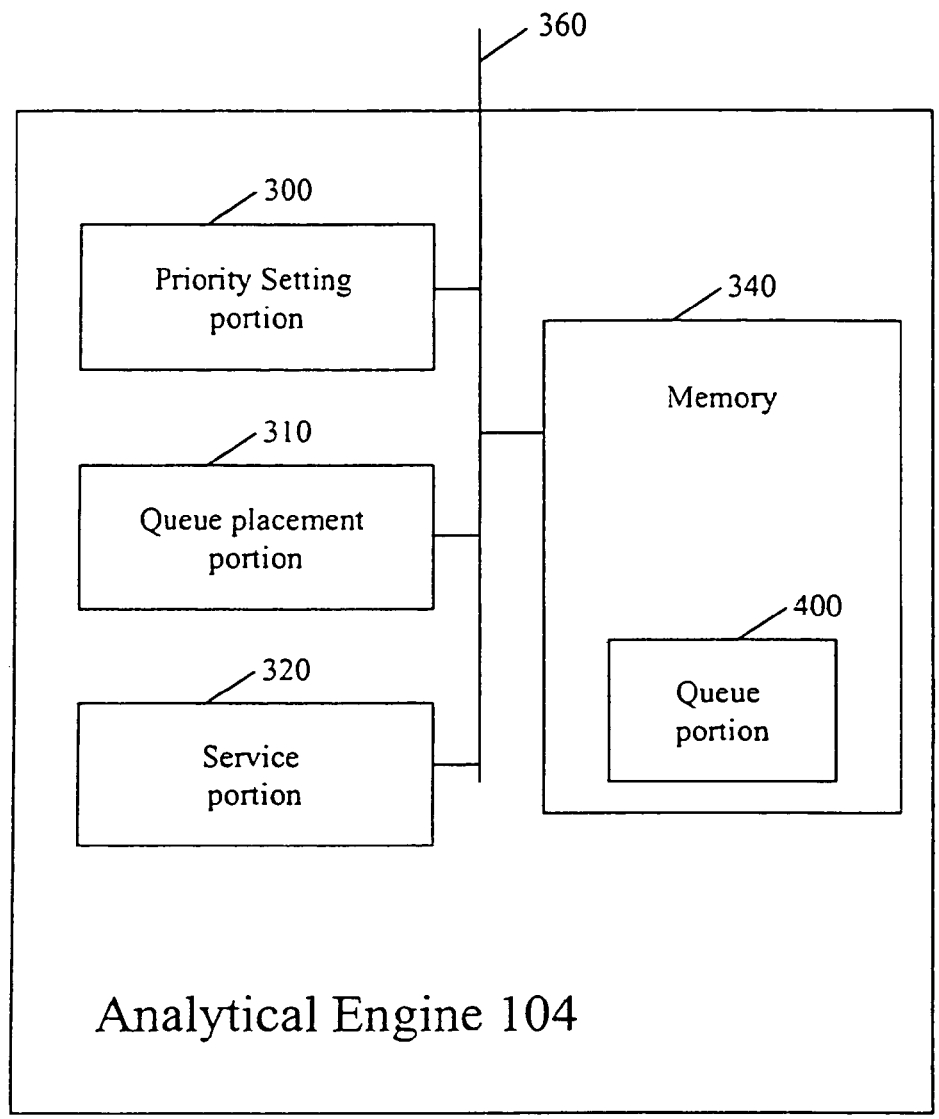
FIG. 3 is a block diagram showing the analytical engine in further detail according to an embodiment of the invention.

FIG. 3 is a block diagram illustrating an architecture for the analytical engine 104 according to an embodiment of the invention. As shown in FIG. 3, the analytical engine 104 includes a priority setting portion 300, a queue placement portion 310, and a service portion 320. The priority setting portion 300 interfaces with the user engine 102, for example, in order to assign priorities to the various individual jobs. The queue placement portion 310 places jobs in a particular queue based on the priority assigned to that job. Further, the service portion 320 performs the dequeuing and service of jobs based on the assigned priorities. It should be appreciated, and as will be discussed below, the analytical engine 104, in accordance with one embodiment, functions so as not to restrict a system administrator's ability to control the flow of job execution. The analytical engine 104 also provides several methods for determining both job priorities and controlling job servicing.

The analytical engine 104 also includes a memory 340. As described below, the memory 340 stores various data related to operations of the priority setting portion 300 and the service portion 320. The memory 340 also includes a queue portion 400. The queue portion 400 stores data representing pending jobs and the disposition of those jobs within queues. The priority setting portion 300, the queue placement portion 310, the service portion 320 and the memory 340 may be connected by a suitable interface 360.

Hereinafter, various aspects relating to operations of the priority setting portion 300, the queue placement portion 310, and the service portion 320 will be described. As used herein, a "job" may include, but is not limited to, any of a wide variety of requests from users requiring processing by a reporting system, including but not limited to, a report request (e.g. a single OLAP question); a document request, where a document is essentially a set of multiple reports; or an element browse request, where "browsing elements" is essentially scanning through records in a database table, for example. As used herein, a "thread" may be characterized as an entity that provides services to jobs. Illustratively, a thread may represent a processing system that processes jobs in sequence. Further, "prioritization" may be characterized herein as assigning a relative job priority to a job. Further, "servicing" may be characterized as selecting the next job to be serviced based on a set of priority queues and an available thread. In other words, the next available thread, i.e., a processing unit, performs the next job based on the priorities. It should be appreciated that the prioritization and servicing of jobs using threads, or other suitable processing units, could be utilized in any of a variety of environments in which jobs are prioritized prior to processing.

As described in further detail below, it should be appreciated that the priority provided to a given job may vary depending on a variety of factors as is desired. In accordance with the systems and methods of the invention, the priority of a particular job may be based on user identification, i.e., which user requested the particular job, for example. That is, the priority setting portion 300 is provided with the ability to prioritize jobs based on user identification. Further, jobs may be prioritized based on estimated time, and/or cost. Priority may also be based on project, including where a project is an application domain, such as finance or marketing, i.e., marketing jobs could be prioritized ahead of finance jobs. Further, priority may be based on Report Type, where Report Type indicates if the report is an initial question or a follow-up question to a previous question. For example, follow-up questions could be prioritized ahead of initial questions.

In further explanation of the systems and methods of the invention, prioritizing based on user identification may include individuals (user names) or roles (all Vice Presidents, regional sales managers, etc. for example) or other identifications.

It should be appreciated that the priority of a job may be based on a wide variety of factors. For example, priority may be based on whether the report is requested by an individual or is a scheduled report intended to go to a group of users or an alert. Further, if a report, for example, is going to a group of persons, the number of people in the group and/or the roles of the people in the group may be taken into account in the priority. Further, a priority scheme may be established in which scheduled jobs take priority over requested jobs at night, but scheduled jobs do not take priority over requested jobs during the day.

In accordance with one embodiment of the systems and methods of the invention, system administrators may be able to override priority and servicing schemes by manually changing the priority of a job in a queue. That is, the priority setting portion 300 provides the ability to alter a job priority once it is entered into a queue. Accordingly, this feature provides an administrator flexibility when job completion priorities vary from the routine.

In accordance with one embodiment of the systems and methods of the invention, the priority of a particular job may be set automatically based on predefined formulas. These formulas can be based on any data, i.e., any variable, available to the system 100. Alternatively, the formulas for prioritization may be based on a user-defined function, for example.

In accordance with a further aspect of one embodiment of the invention, it should be appreciated that a priority of a job may be based on the particular user requesting the to job, as described above. Relatedly, a "fair share" technique may be utilized in some embodiments of the invention. In the fair share technique, each additional job in a queue from a particular user is assigned a progressively lower priority. That is, the first job is priority one, the second priority two, and so forth. By utilizing a type of fair share technique, each user has a "fair" access to the processing capabilities of the system 100. Once a job is done executing, all of the users' other jobs may then be "bumped" up in priority by the priority setting portion 300 based on output from the service portion 320 that a job was completed.

It should be appreciated that one goal of the analytical engine 104 is to prioritize and service jobs in such a manner as to ensure efficient usage of resources. There may, of course, be a variety of resources available to the analytical engine 104. For example, a relational database manager server (RDBMS) that services warehouse queries may be utilized as a processing resource. Additionally, a RDBMS that services metadata queries may be utilized. Further, any number of analytical processing engines may be utilized. To explain further, the analytical engine 104, including the priority setting portion 300 and the service portion 320, provides the ability to strike a balance between two or more goals, as is desired, through establishing a priority technique and a job servicing technique.

In accordance with one embodiment of the systems and methods of the invention, one goal is to optimize total system throughput. Another goal is to optimize individual query response. It should be appreciated that high throughput ensures that the processing system being utilized to complete the various jobs experiences stable, full utilization; and that as many report requests as possible are fulfilled in as short a time as possible. At the same time, however, it should be appreciated that users, i.e., customers for example, want to ensure that some sense of "fair share" is granted to all the various jobs that require the system resources. Accordingly, it should be appreciated that the systems and methods of the invention allow a balance to be attained between these and other goals, as desired. Accordingly, goals which may be taken into account include system throughput, more quickly processing more urgent or important reports, and if desired "fair share," for example.

For purposes of illustration, the following examples are included in accordance with embodiments of the methods and systems of the invention. The examples show different schemes that may be put into place to prioritize jobs.

Example 1

Company A

There are two projects: Production project, Training project. There are also two user groups: Production users, Training users. The priority function: any job from the Production project is higher priority than Training project. The total number of queues: Two, one for Production project, one for Training project. The job servicing issues includes needs to avoid job starvation; and the Training project needs to get some access to the database.

Example 2

Company B

There are two projects: Sales project, Operations project. Also, there are three user groups: Sales managers, Operations managers, VP of Operations. The priority function includes jobs in the Sales project from sales managers receive high priority, as do jobs in the Operations project from operations managers; jobs in the Sales project from operations managers and jobs in the Operations project from sales managers receive low priority; and jobs from the VP of Operations in either project receive highest priority. Further, the total number of queues: Three, one for Sales project-Sales managers and Operations project-Operations managers, one for Sales project-Operations managers and Operations project-Sales managers, and one for VP of Operations.

As should be appreciated by the above examples, a variety of priority schemes may be used in accordance with embodiments of the methods and systems of the invention. For example, a default scheme may be used in which all jobs are processed on a first in, first out basis. Further, a simple "priority by report cost" scheme may be used in which jobs are prioritized solely by estimated report cost. Further, a simple "priority by user" scheme may be used in which jobs are prioritized solely based on the user who submitted the job. Also, a simple "priority by project" scheme may be employed in which jobs are prioritized solely based on the project where the job comes from.

As described above, a job is submitted to the analytical engine 104 through a user using the user engine 102, for example. Once this job is submitted to the analytical engine 104, the priority setting portion 300 establishes a priority of the submitted job. Prioritization may be characterized as the assignment of a relative priority to each job that is submitted to the engine 104. In accordance with one embodiment, this assignment of priority may be based upon a priority function that determines a priority value, given a set of relevant priority variables. Accordingly, when the system administrator defines a priority scheme, he or she is simply selecting the relevant priority variables and specifying a priority function in accordance with one embodiment of the systems and methods of the invention. Illustratively, priority for an individual job may be assigned based on three priority variables. These three priority variables include project type, user, and cost. Other variables may also be used as desired.

A job may be prioritized based on the nature of the project. Utilizing this variable, jobs from different projects will have different priority values and all jobs within a project will contain the same priority value, i.e., assuming that no other variables are factored into the prioritization. Accordingly, for example, all jobs in project A may have a higher priority than all jobs from project B.

Priority may also be based on the user, i.e., the human person who submitted the job. All jobs submitted by the same user may thus have the same priority value, assuming no additional variables are factored into the prioritization. Accordingly, for example, all jobs from user A have a higher priority than jobs from user B. However, it should of course be appreciated that priority of a job may likely not be based on a particular project or user, but rather may be based on multiple factors.

Illustratively, users may have a different relative priority based on the particular project that a particular user is submitting. Thus, if an accountant working in accounting submits a job, that job may have a higher priority than the same human accountant submitting a job related to social activities. It should thus be appreciated that in some circumstances it may be difficult to assign a single priority value to a particular user. Rather, priority may be assigned to a job based on a combination of user, project, as well as other factors as is desired.

Further, in accordance with one embodiment of the systems and methods of the invention, priority may be based on user groups, rather than individual users. This technique serves as a time-saver to system administrators. If a system administrator deems that an individual user does indeed need a separate priority, then the systems and methods of the invention allows the administrator to create a group for that user.

Illustratively, a further priority value which may be used to assign priorities to individual jobs, is a cost parameter. For example, the engine 104 may be preparing a report. Accordingly, the cost parameter is a report cost. Submitted jobs may be prioritized based on an estimated cost value for the report. Cost is a general variable that can represent several different characteristics of the job. For example, report cost can include such parameters as a report priority, report type, historical report cost, and estimated report cost. Each of these characteristics is dictated by the nature of the report. In this illustrative example relating to report costs, it should be appreciated that a variety of other parameters or characteristics may be utilized as is desired.

In further explanation of the report costs example, the "report priority" is a fixed priority for a given report. Thus, a system designer may assign a priority value to specific reports. This allows the system designer to specify certain reports that always receive special priority. Alternatively, reports that always receive low priority may be accorded a suitable report priority ranking.

Related to report priority, a further characteristic may be "report type." This property of a job indicates if the job was generated as a new report, as a data surf, or as a drill-down, for example. This characteristic allows the system designer to give higher priority to more "interactive" jobs, such as drill-downs and data surfs, for example. For example, a report created via a drill-down may have a higher priority than a standard report. In accordance with this illustrative embodiment, that the drill-down report might be created for follow-up analysis and should be returned to the user as quickly as possible.

A further characteristic in accordance with this illustrative example is "historical report costs." This characteristic reflects an estimate of the complexity of the report based upon an historical record of executing the report in the past. The historical report costs may be established when the job is submitted based upon an historical record of running the same report.

A further characteristic is "estimated report costs." This characteristic is an estimate of the complexity of the report based upon the analytical engine's 104 knowledge of the query that it generates. In accordance with this technique, the priority setting portion 300 will first determine the estimated cost for a report and then assign it a priority.

In accordance with one embodiment of the system method of the invention, "priority variables" may be utilized in a "priority function". The particular variables utilized, as well as the priority function, will of course depend on the particular implementation of the method of the invention. A priority function defines a priority value based on the set of priority variables factored into the priority function. The priority variables and functions, which are utilized to determine the priority value of a given job, may vary as is desired. Once a priority value is determined, then that priority value allows the priority setting portion 300 to place a particular job in a queue set or queue.

It should be appreciated that three priority variables are described herein including project, user and cost. Further, the cost variable, for example, is used to represent multiple report characteristics including the estimated cost, and historical cost, for example. However, rather than using cost to generalize multiple report characteristics, each characteristic could be represented as another priority variable in accordance with one embodiment of the systems and methods of the invention. That is, priority functions could be implemented as mappings of project, user, report, job type, historical cost, and estimated cost to result in a priority value, for example. This approach would eliminate the need to define a report cost function as something separate from a priority function. However, it may allow the number of input combinations to the priority function to grow very quickly. Accordingly, and as noted above, it should be appreciated that both the priority variables as well as the priority formulas or functions, utilized to produce a priority value based on the priority variables, may vary. It should be appreciated that priority functions may be site-specific, meaning that each customer, for example, will define the priority formula to meet their needs. Examples include the following, where (Project, User, Report, Type, Historical Cost, Estimated Cost) represents one or more combinations of the seven priority variables:

(any, User CEO, any, Drill-down report, any, any)->Priority 1;

(any, User CEO, any, Normal report, any, any)->Priority 2;

(any, any other User, any, Drill-down report, any, any)->Priority 3;

(any, any other User, any, Normal report, any, any)->Priority 4;

(Accounting Project, Accounting Manager, any, any, any, any)->Priority 1;

(Marketing Project, Marketing Manager, any, any, any, any)->Priority 1;

(Marketing Project, Accounting Manager, any, any, any, any)->Priority 2;

(Accounting Project, Marketing Manager, any, any, any, any)->Priority 2;

(Marketing Project, any other user, any, any, any, any)->Priority 3; or (Accounting Project, any other user, any, any, any, any)->Priority 3.

Figure 4:
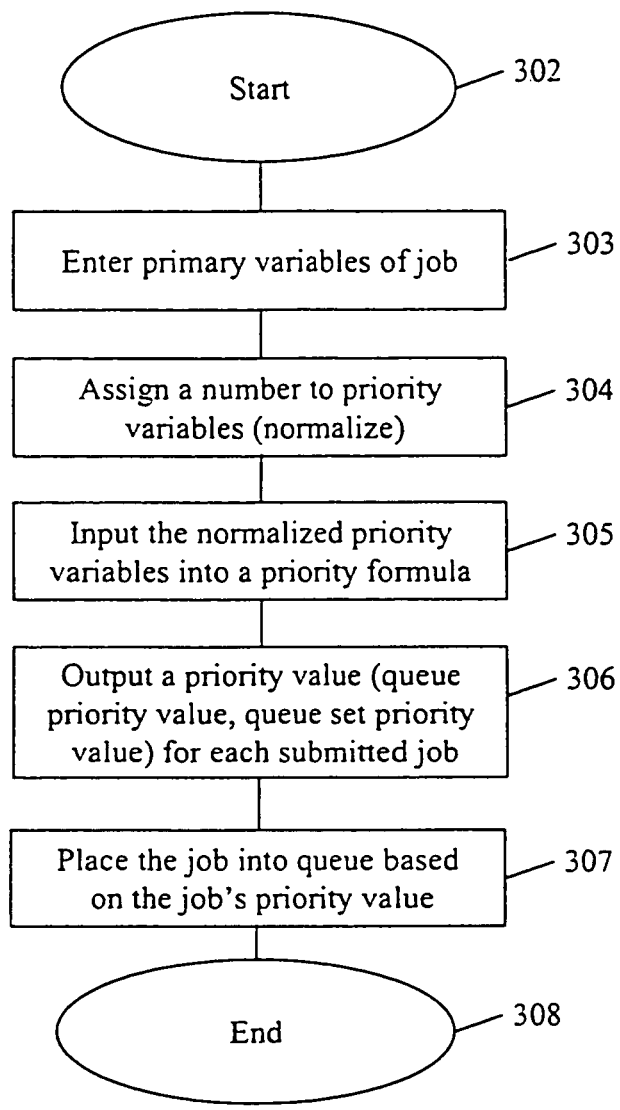
FIG. 4 is a flowchart showing a process of assigning priorities to and servicing jobs according to an embodiment of the invention.

FIG. 4 is a flowchart showing operation of the priority setting portion 300. As shown in FIG. 4, the process starts in step 302. Then, the process passes to step 303. In step 303, the job request is received and the priority setting portion 300, for example, inputs the priority variables of the job. Then, in step 304, a number is assigned to the priority variables, i.e., the priority variables are normalized as is described in further detail below. Then, the process passes to step 305.

In step 305, the normalized priority variables are input into a priority formula. Then, in step 306, a priority value is output for each submitted job. As described below, the priority value may include a queue priority value and/or a queue set priority value. After step 306, the process passes to step 307. In step 307, the job is placed into a queue based on the job's priority value. Then, the process passes to step 308. In step 308, the process ends.

In accordance with one embodiment of the systems and methods of the invention and as noted above, the priority variables, which are utilized in the priority formula, may be normalized. This normalization may provide a weighting affect and/or may allow a "type" variable, for example, to be translated into a numerical value.

Illustratively, with further reference to the report cost value example described above, the report priority is a property of a report definition, such as an integer value between 0 and 100. This value can be directly assigned to a job as a report cost by the requesting user. Further, the "report type" is a property of the job. A priority variable may be assigned to a job based on mapping of particular report types to report cost values, for example. Thus, perhaps a drill-down report maps to a report cost value of 40. Further, an historical cost can be assigned to a job based on a historical cost table. The historical cost may also be normalized to a standard scale. Further, the estimated cost as described above may be normalized in a suitable manner, such as in the same manner as the historical cost. It should be appreciated, this framework allows for report cost functions to be defined as arithmetic functions.

As described above, various priority variables may be utilized in a priority function. The priority variables may be normalized as is desired. In turn, the priority function maps the different combinations of priority variables to a unique priority value. Accordingly, each job that is submitted to the engine 104 is assigned a priority value based upon the job's corresponding project, user, and cost in accordance with one embodiment of the systems and methods of the invention.

Once the priority setting portion 300 establishes a priority value of a submitted job, this priority information is then stored in the memory 340 in any suitable manner. Subsequent to the priority value being assigned, the queue placement portion 310 initiates operation with respect to that particular job for which the priority value was determined. Of course, it should be appreciated, that operations of the priority setting portion 300, the queue placement portion 310 and the service portion 320 are continuous in that jobs are continually being submitted, prioritized, queued and serviced, i.e., performed.

In accordance with embodiments of the systems and methods of the invention, a job is placed in a particular queue based on the job priority value. To explain further, the queue placement portion 310 utilizes a hierarchical queue structure that includes both queues and queue sets in accordance with one embodiment. As a result, in accordance with an embodiment of the method and system of the invention, each job may have two priority values, i.e., a "queue set priority value" and a "queue priority value." The queue set priority value determines which queue set the job is placed into. Further, the queue priority value determines which queue, within a particular queue set, the job is placed. Further details of both the queue set and queue are described below.

In accordance with further aspects of the invention, other priority values may be used which relate to various aspects of a job. For example, a priority value may be provided for "where a job should be" in a particular queue relative to another job in that queue. Further, it should be appreciated that one or more types of priority values can be assigned to a job. For example, a job may be assigned one or more of a queue set priority value, a queue priority value, a relative priority value (within a queue), and other priority values, for example.

Figure 5:
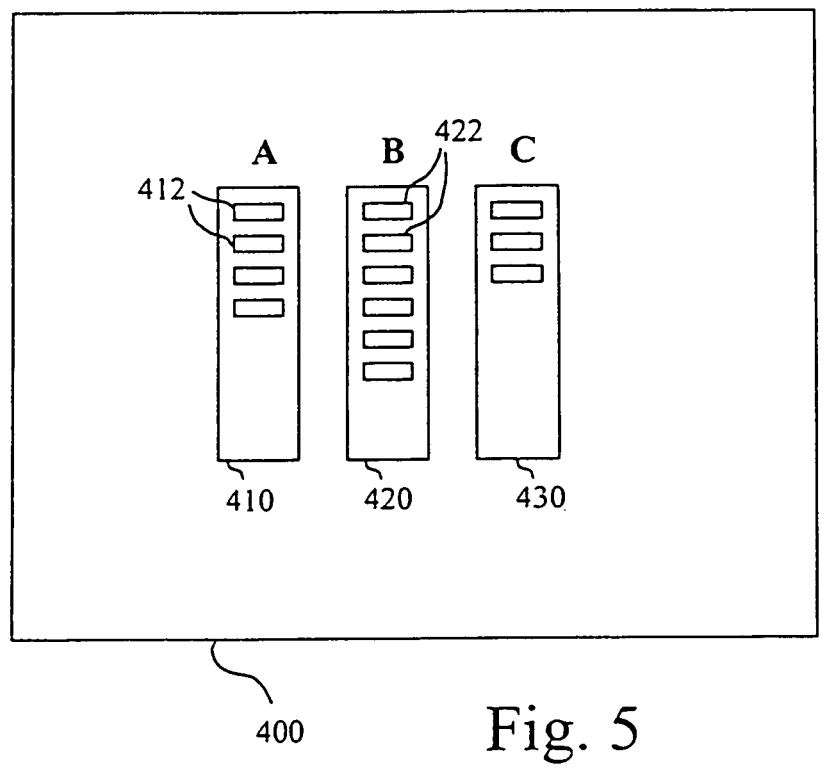
FIG. 5 is a block diagram showing the queue portion 400 in further detail according to an embodiment of the invention.

As described above, the memory 340 includes a queue portion 400. Once a priority value or priority values are determined for a particular job, this priority value information, as well as the particulars of the job, are stored in the queue portion 400. FIG. 5 is a block diagram illustrating further aspects of the queue portion 400.

FIG. 5 is a block diagram showing in further detail the queue portion 400 in accordance with one embodiment of the method and system of the invention. As shown in FIG. 5, the queue portion 400 includes a plurality of queue sets. Specifically, the queue portion 400 includes a queue set A 410, a queue set B 420 and a queue set C 430.

As shown in FIG. 5, the queue set A 410 contains a plurality of jobs 412. In a similar manner, the queue set B 420 contains a plurality of jobs 422. The queue set C 430 also contains jobs. In accordance with one embodiment of the systems and methods of the invention, each queue set (410, 420, 430) has a priority range associated with that particular queue set. The range, as well as the queue set/queue structure, is defined by a system administrator, or other suitable person, for example. For example, queue set A may have a priority range 1-5; queue set B may have a priority range 6-30; and queue set C may have a priority range 31-100. Such priority ranges may be utilized when priority values of respective jobs vary from 0 to 100. Accordingly, jobs are inserted into a particular queue set (410, 420, 430) based on the priority value of the particular job. Thus, if a job has a priority of between 1 and 5, then that particular job will be inserted into queue set A 410. Alternatively, if a particular job possesses a priority value of 27, for example, that particular job will be inserted into queue set B 420.

In accordance with one embodiment of the systems and methods of the invention, all jobs within a particular queue are treated with equal priority. Consequently, a job with a priority value 1 receives the same processing priority by the service portion 320 as a job with a priority value of 2, 3, 4 or 5. Further, jobs may be inserted into the end of each queue. This provides for a first in-first out (FIFO) processing of the jobs in a particular queue. However, it should be appreciated that all jobs within a particular queue do not have to have the same priority. Rather, one or more jobs may have a different priority, as is desired.

Figure 6:
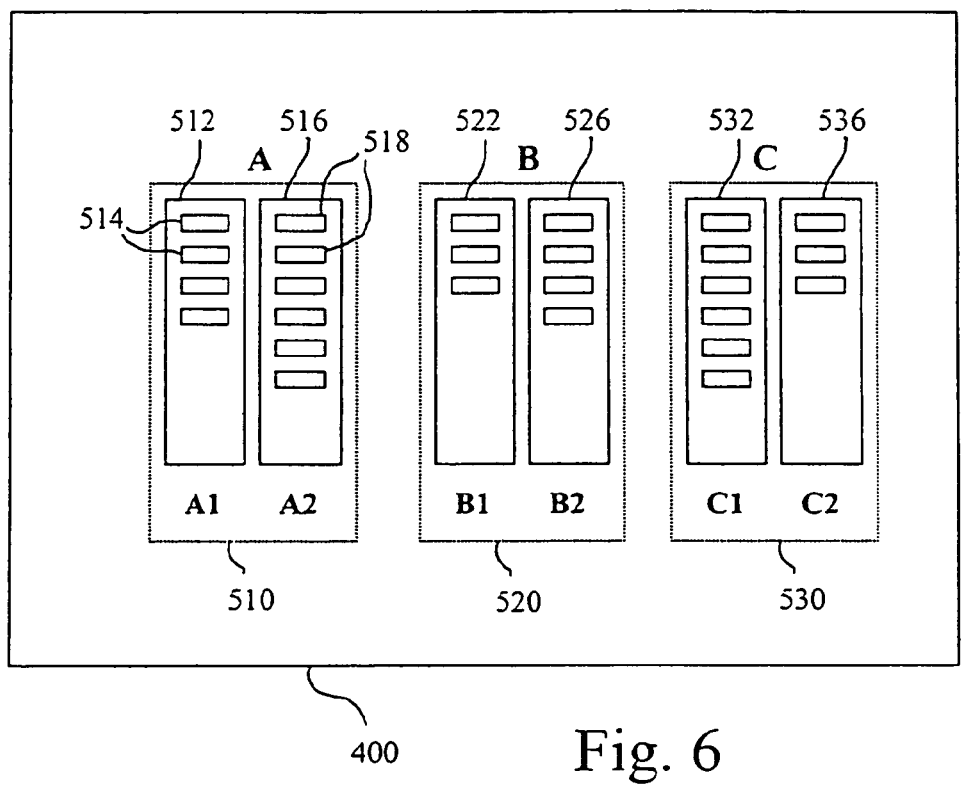
FIG. 6 is a block diagram showing the queue portion 400 in further detail according to a further embodiment of the invention.

In accordance with a further embodiment of the systems and methods of the invention, multiple queues may be defined within each queue set. For example, this arrangement of each queue set may be performed by an administrator or other suitable person. When utilizing a queue within a queue set, each job may possess two levels of priority values, as is described above. The first priority value is to define the queue set, and the second priority value is to determine a particular queue within that queue set. FIG. 6 is a diagram in accordance with a further embodiment of the queue portion 400.

As shown in FIG. 6, the queue portion 400 includes queue set 510, queue set 520 and queue set 530. The queue set 510 includes queue A1 510 and queue A2 516. The queue A1 512 contains various jobs 514. Similarly, the queue A2 516 contains jobs 518.

The queue sets 520 and 530, as shown in FIG. 6, also contain multiple queues as well as jobs within those queues. Specifically, queue set 520 contains queue B1 522 and queue B2 526. Each of the queue B1 522 and the queue B2 526 contains jobs. Further, the queue set 530 contains queue C1 532 and queue C2 536, each of which contain jobs.

In accordance with one embodiment of the method and system of the invention, jobs may be placed into the various queue sets and queues depending on the priority value or values of a particular job. Any of a wide variety of priority schemes may be utilized to place the jobs in the various queue sets and queues. For example, Table 1 below shows an illustrative priority scheme.

TABLE 1

| QS Priority Range | Queue Set | Queue Priority Range | Queue |
|---|---|---|---|
| 1-5 | A | 1-2 | A1 |
| 1-5 | A | 3-5 | A2 |
| 6-30 | B | 6-20 | B1 |
| 6-30 | B | 21-30 | B2 |
| 31-100 | C | 31-60 | C1 |
| 31-100 | C | 61-100 | C2 |

A job with a queue set priority between 1 and 5 will be assigned to queue set A. Further, a queue set (QS) priority range of 6-30 results in the queue placement portion 310 placing a job in the queue set B 520. Further, a QS priority range of 31-100 results in the queue placement portion 310 placing a job in the queue set C 530.

Further, Table 1 also shows queue priority ranges, as opposed to queue set priority ranges. For example, a queue priority range of 1-2 results in a job being placed in the queue A1 510. Further, a queue priority range of 6-20 results in a job being placed in the queue B1 522. As shown in Table 1, the queue priority range may vary between 1-100.

As shown in Table 1, the queue priority range uniquely identifies which queue a particular job is placed based on the priority value of that queue. Since the queue priority range uniquely determines which queue a job is placed, it should be appreciated that the queue priority range may be utilized by itself, to not only control which queue, but also which queue set. Accordingly, it should be appreciated that a variety of priority schemes, both relating to queue set priority values, queue priority values, or both may be utilized to place a particular job in a particular queue set and queue.

As described above with reference to FIG. 5, in accordance with one embodiment of the invention, jobs placed by the queue placement portion 310 into the same queue are treated equally. For example, each new job placed within a particular queue is inserted into the end of that queue. Consequently, a job with a priority value of 1 receives the same processing priority as a job with a priority value of 2.

It should be appreciated that queue set priority and queue priority may be the same value or two different values. With reference to Table 1 above, as described, the range used to divide jobs into different queues is simply a further refinement of the ranges used due to find queue sets. This may be the case but does not necessarily have to be. That is, a second priority value may be used with different range values to place jobs into queues. However, a job may preferably be assigned a queue set, in accordance with some embodiments of the invention, prior to being inserted into a queue within that queue set. Additionally, it is possible to define a configuration with only one queue set and multiple queues within that set.

As described above, priority functions may be used to map various priority variables to a priority value. It should be appreciated that when the number of combinations of priority variables, such as project, user, and cost, is small, then it is relatively simple to explicitly define a mapping table for each combination. However, when the number of combinations is large, it becomes more difficult to define the mapping explicitly. Rather, it should be appreciated that it may be easier to normalize the priority variables into numerical values and define an arithmetic function which, based on input of priority variables, will output a priority value.

In accordance with one embodiment of the systems and methods of the invention, priority functions may be defined at the queue structure level. Regardless of whether the implementation is in arithmetic calculation, or alternatively, some sort of mapping, the definition of the function may be assigned to a queue structure. Priority functions are evaluated by the priority setting portion 300 and the resulting value is used to assign the job to a queue. It should be appreciated that report cost functions should be defined at the same level as priority functions.

It should be appreciated that a job may need to be assigned to a queue before all the priority variables to the priority functions are known. For example, a job may be placed into a queue before the job has been assigned an estimated cost. In this situation, a default value may be assigned to the missing priority variable. The missing priority variable may be updated once the information is known, assuming the job has not already been processed.

Hereinafter, further aspects of the systems and methods of the invention will be described with reference to operation of the service portion 320. Specifically, aspects of the invention relating to job servicing will be described below. In accordance with one embodiment of the systems and methods of the invention, the service portion 320, given a set of prioritized queues, determines the order in which jobs are dequeued or serviced. Various methods may be utilized to service the queued jobs. Specifically, the service portion 320 may utilize a first in first out technique, a fixed thread-selfish technique, a fixed-thread cooperative technique, a highest priority first technique or alternatively, a weighted share technique, or any other suitable technique. As described below, the various methods are discussed in terms of queues and/or queue sets.

Figure 7:
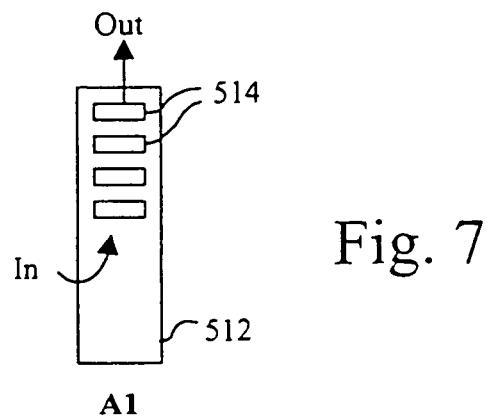
FIG. 7 is a diagram showing a queue and illustrating the first in first out technique according to an embodiment of the invention.

The service portion 320 may utilize a first in first out technique. Using this technique, the service portion 320 dequeues and services jobs in the order in which the jobs entered the queue. When this method is used and only one queue exists, jobs are prioritized based only on their time of submittal. Accordingly, the first in first out technique is not effected by how many threads are used for job servicing. In accordance with one embodiment of the systems and methods of the invention, this method is used to process jobs, within a queue, regardless of how jobs across queues are serviced. FIG. 7 is a diagram illustrating the first in first out technique. As shown in FIG. 7, the queue A1 512 contains a plurality of jobs 514. As shown in FIG. 7, the first job in, is the first job out, utilizing the first in first out technique.

Figure 8:
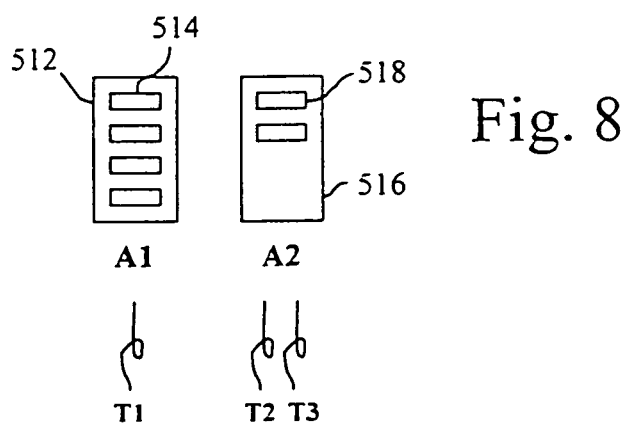
FIG. 8 is a diagram showing multiple queues and illustrating the fixed thread-selfish technique according to an embodiment of the invention.

In accordance with a further embodiment of the invention, the service portion 320 may use a fixed thread-selfish technique. In this technique, each queue is assigned a certain number of threads. Those threads are dedicated to that particular queue and cannot service jobs outside of that queue. As shown in FIG. 8, queue A1 512 has one dedicated thread T1 and queue A2 516 has two dedicated threads (T2 and T3). Accordingly, even if queue A1 512 is full and queue A2 516 is empty, the threads T2 and T3 will not service jobs from queue A1 but will wait idle until a job enters queue A2. This technique ensures that jobs in each queue are serviced at constant levels and not effected by the activity of other queues. However, it should be appreciated that utilizing this technique, threads are not polled, i.e., utilized, efficiently and may sit idle while other queues are full.

Figure 9:
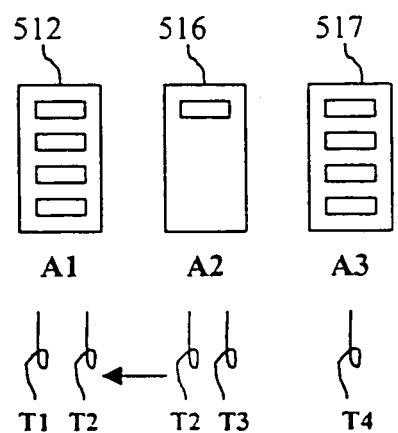
FIG. 9 is a diagram showing multiple queues and illustrating a fixed thread-cooperative technique according to an embodiment of the invention.

A third job servicing technique is a fixed thread-cooperative technique. In a fixed thread-cooperative technique, each queue set is assigned a certain number of threads. If a thread is idle and there are no jobs in need of processing in the queue set, the thread may switch to another queue set. As a result, the thread will be on temporary loan, so to say, to the second queue set and will check for jobs in the primary queue set after servicing each job in the secondary set. FIG. 9 is a diagram illustrating the fixed thread-cooperative technique. As shown in FIG. 9, the thread T2 is on loan to the queue A1 512. Since there are no pending jobs in the queue A2 516, it should be appreciated that if T2 did not switch to queue A1 512, the thread T2 would sit idle. After each job T2 processes in queue A1 512, the thread T2 first checks to see if new jobs have entered queue A2 516. If so, then the thread T2 switches back to its original queue A2 516.

In configurations with more than two queues, it should be appreciated that threads may switch to more than a single queue. For example, threads may move in a serial fashion from one queue to the next based on a defined priority for the queues. This priority is different than job priority. As shown in FIG. 9, for example, queue A1 512 may be the highest priority queue followed by A2 with A3 having the lowest priority. With this priority scheme, threads may move from A2 to A1, but not to queue A3. As a result, this arrangement allows limited cooperation. If queues are not prioritized, threads from empty queues should switch to busy queues using a round robin scheme, for example. With further reference to FIG. 9, for example, thread T2 will service a job from queue A1 512, and then service a job from queue A3 517. However, it should be appreciated that threads are not limited to moving in serial fashion. Rather, threads may move in any of a number of ways, including in a serial fashion.

Figure 10:
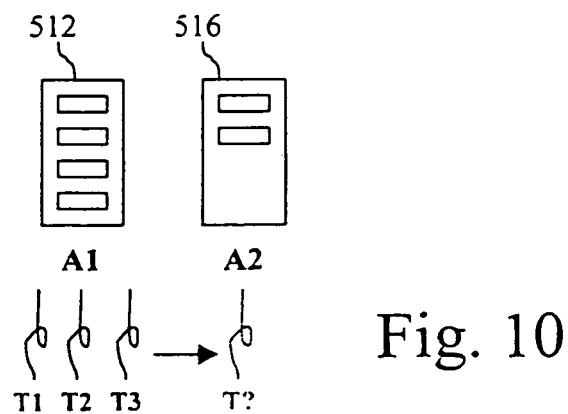
FIG. 10 is a diagram showing multiple queues and illustrating a highest priority first technique according to an embodiment of the invention.

In accordance with a further embodiment of the systems and methods of the invention, the service portion 320 may utilize a highest priority first technique to process the queued jobs. In the highest priority first technique, the service portion 320 services each queue set in serial fashion based on priority. That is, all available threads service jobs in the highest priority queue set first. Accordingly, none of the threads are allocated to any particular queue set. One shortcoming of the highest priority first technique is that lower levels queues may rarely be serviced. FIG. 10 shows aspects relating to the highest priority first technique. As shown in FIG. 10, the queue A1 512 may be defined as having a higher priority than the queue A2 516. Further, threads T1, T2 and T3 are not assigned to either queue (512, 516) but will always attempt to service jobs in queue A1 512 prior to servicing jobs in queue A2 516 utilizing the highest priority first technique.

Figure 11:
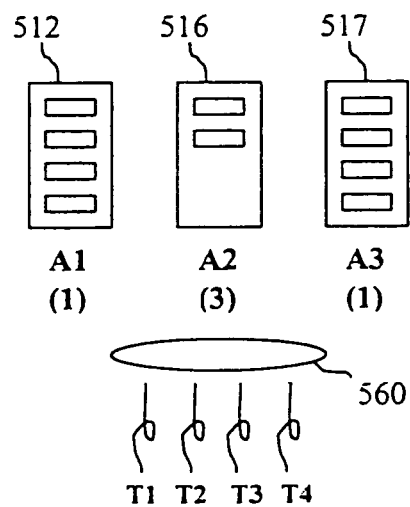
FIG. 11 is a diagram showing multiple queues and a thread pool illustrating a weighted share technique according to an embodiment of the invention.

In accordance with a further embodiment of the systems and methods of the invention, the service portion 320 may utilize a weighted share technique. In using the weighted share technique, each queue has a weighting factor. Threads are not assigned to any one queue but are shared among all queues. The weighting factor allows a queue to receive higher service levels relative to other queues. To explain with reference to FIG. 11, for example, queue A1 512, queue A2 516, and queue A3 517, have weights of 1, 3 and 1, respectively. Further, there are four threads allocated to service all of the queues. Using the weighted share technique, thread T1 will service one job in queue A1. Threads T2, T3, and T4 will service a total of three jobs in queue A2 516. Thereafter, the first thread to finish processing will service one job in queue A3 517. The next thread to finish processing will service one job in queue A1 512. Thereafter, three jobs from queue A2 516 are processed all by one job from queue A3 517. This cycle continues, always processing jobs in a cyclical manner and with respect to the relative weighting factors. Further, this method ensures that all threads are always busy as long as pending jobs exist. As shown in FIG. 11, the threads T1, T2, T3 and T4 may be pulled from a thread pool 560.

Hereinafter, further aspects of servicing of queue sets and queues will be described in accordance with embodiments of the systems and methods of the invention. Specifically, it should be appreciated that various "governors" may be utilized by the service portion 320 in processing of jobs. In accordance with one embodiment, the service portion 320 honors all governors, which are in place. For example, one governor may limit the number of jobs any one user may have concurrently executing. This governor, in accordance with one embodiment, holds true whether the jobs exist within one queue, multiple queues, or across queue sets. Accordingly, when this limit is reached, the service portion 320 attempts to process the next job in the current queue instead of treating the job as processed and skipping to the next queue based on the servicing method.

It should be appreciated that when using queue sets, a designer has the ability to utilize servicing methods in combination. That is, one service method may be used at the queue set level and another at the queue level. The following chart lists possible combinations of methods. It should be noted that first in first out is only used within a queue and would not be defined as a method across queues or queue sets, in accordance with one embodiment of the method and system of the invention.

TABLE 2

| Queue Set Method | Queue Method | Description |
| --- | --- | --- |
| Fixed Thread (Selfish) | Fixed Thread (Selfish) | Threads are dedicated to only specific, multi level priority groups. |
| Fixed Thread (Selfish) | Fixed Thread (Cooperative) | Threads are dedicated to queue sets and cannot service other queue sets. Within each queue set, threads are divided among various queues and can be loaned to other queues. |
| Fixed Thread (Selfish) | Highest Level First | Threads are dedicated to queue sets and cannot service other queue sets. Within each queue set, threads will process jobs from the highest priority queue first. |

TABLE 2-continued

| Queue Set Method | Queue Method | Description |
| --- | --- | --- |
| Fixed Thread (Selfish) | Weighted Share | Threads are dedicated to queue sets and cannot service other queue sets. Within each queue set, threads are pooled and process jobs based on the defined queue weights. |
| Fixed Thread (Cooperative) | Fixed Thread (Cooperative) | Threads are dedicated to queue sets but may be loaned to other queue sets during idle times. Within each queue set, threads are dedicated to queues but may be loaned to other queues during idle times. |
| Fixed Thread (Cooperative) | Highest Level First | Threads are dedicated to queue sets but may be loaned to other queue sets during idle times. Within each queue set, threads will process jobs from the highest priority queue first. |
| Fixed Thread (Cooperative) | Weighted Share | Threads are dedicated to queue sets but may be loaned to other queue sets during idle times. Within each queue set, threads are pooled and process jobs based on the defined queue weights. |
| Weighted Share | Highest Level First | Threads are pooled across all queue sets and process jobs based on the defined queue set weights. Within each queue set threads will process jobs from the highest priority queue first. |
| Weighted Share | Weighted Share | Threads are pooled across all queue sets and process jobs based on the defined queue set weights. Within each queue set, threads are pooled and process jobs based on the defined queue weights. |

It should be appreciated that the system 100 in accordance with the systems and methods of the invention, provides a great deal of flexibility in defining queue structures, priority schemes, and job servicing schemes. Beneficially, this flexibility is presented to a system administrator, for example, in as simple a manner as possible. To provide this flexibility, the system administrator configuring priority and servicing schemes within the system 100 should be able to make a series of assumptions. Of course, the set up of the priority schemes, for example, will allow such assumptions to be made.

For example, a first assumption might be that prioritization and servicing applies in the same manner to all processing units. That is, although the system 100 may support schemes that vary across processing units, a system administrator should only be concerned with one prioritization and servicing scheme. Further, it should be appreciated that the prioritization and servicing scheme may be fixed for certain jobs. For example, the prioritization and servicing scheme may be fixed for both metadata browsing and for element browsing. As should be appreciated, metadata browsing is a type of request where the end user is looking through the set of OLAP questions (e.g. reports) that have been defined in the system. Element browsing is a type of request where the end user is looking through the set of data elements available in the database when asking a question. For example, if a user wants to request a report to show sales for a store during Q4 2000, and the system prompts the user by saying "which store" and shows the user a list of stores, the request to generate that list of stores from the database is an element browse.

To explain further, although priority schemes are available to all processing units, ease of use by end users may be helped by characterizing priority schemes in terms of a processing unit that executes queries. To the end user, configuring the priority and servicing scheme may be equivalent to configuring the priority and servicing scheme for executing jobs against a warehouse, for example.

In accordance with one embodiment of the systems and methods of the invention, a scheme, as described above, may be configured utilizing a two step process. First, the end user may identify a set of priority queues and the rules for assigning jobs to those queues. Secondly, the end user selects a servicing scheme to select jobs from the queues for execution.

A system designer, for example, may identify priority queues, i.e., or in other words define "priority", utilizing various approaches. In accordance with one embodiment of the systems and methods of the invention, a system designer defines a desired priority scheme using a list of available projects and a list of available user groups. Then, the system designer picks a particular project from the list of projects and a particular user group from the list of user groups. This combination of chosen items, from lists may be used to create a new "bucket", i.e., a new queue. Accordingly, a particular combination chosen by the system designer is assigned to the bucket or queue. Similarly, the system designer may assign any of a plurality of combinations to form additional queues as is desired.

It should be appreciated that it may be desirable to limit the number of combinations that are possible. For example, the system designer may limit himself or herself to three priority groups and three cost ranges, for example.

A system designer also selects a job servicing scheme. When selecting a job servicing scheme, a system designer selects from among the various job servicing schemes described above. Based on the list of queues defined, a system designer can sort the various defined queues into queue sets and specify job servicing algorithms or other processes at the queue set level as well as at the queue level.

Figure 12:
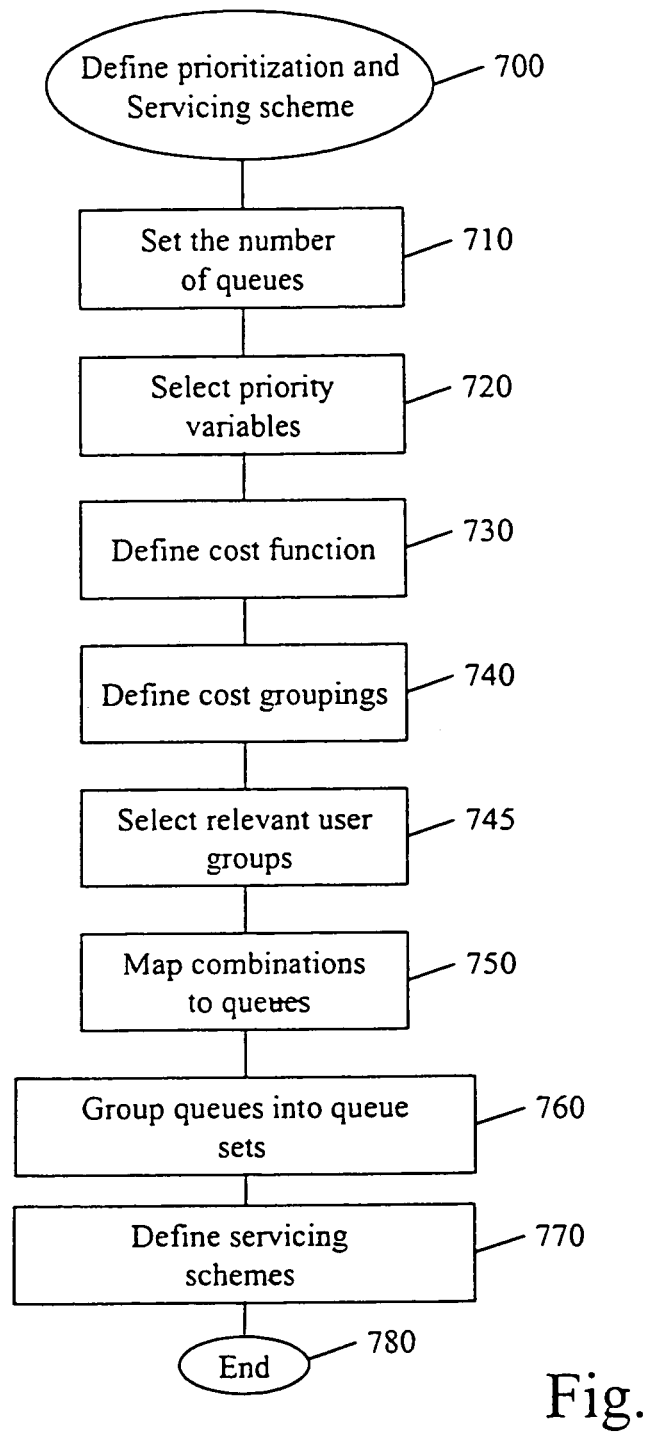
FIG. 12 is a flowchart showing a process to define a prioritization and servicing scheme according to an embodiment of the invention.

In accordance with one embodiment of the systems and methods of the invention, a system administrator, for example, may utilize a series of steps to define a prioritization and servicing scheme. FIG. 12 is a flow chart showing these steps to define a prioritization and servicing scheme. As shown in FIG. 12, the process starts in step 700. Then, the process passes to step 710 in which the number of queues is set. Then in step 720, the process selects the priority variables. Then, in step 730, the cost function is defined. After step 730, the process passes to step 740.

In step 740, the cost groupings are defined. In step 745, the relevant user groups are selected. Then, in step 750, the combinations to the queues are mapped. Then, in step 760, the queues are grouped into queue sets. Then, the process passes to step 770. In step 770, the servicing schemes are defined. Then, the process passes to step 780. In step 780, the process ends. Hereinafter, further aspects of the process of defining a prioritization and servicing scheme will be described with further reference to FIG. 12.

In accordance with embodiments of the systems and methods of the invention, each step is described in detail below. However, it should be appreciated that the invention is not limited to the process of FIG. 12 as described above. Further, such steps may be varied or altered as is desired.

The system administrator may first select the number of queues to be used in step 710. For example, the number of queues used may be limited to 5 queues.

The system administrator may then select the variables that may be considered in the priority function in step 720. Illustratively, the options may be project, user, and cost. It should be appreciated, only the variables selected will be utilized to factor into the function. Any of a variety of variables may be used as is desired.

If cost were selected as one of the relevant priority variables, the system administrator may define a cost function to map combinations of priority, type, historical cost and estimated cost, as described above, to unique values, for example.

Further, the system administrator may be able to define a linear combination of characteristics. For example, the system administrator may assign coefficients to each characteristic to determine the cost function. For example, the cost function may be defined as:

$$C=(0.5)*report\_priority+(0)*report\_type+(0.25)*historical\_cost+(0.25)*estimated\_cost$$

As described above, the report cost function may be defined in such a way that the possible values are normalized to a range of 0 to 100, in accordance with one embodiment of the systems and methods of the invention.

Further, it should be appreciated that once a cost function has been defined, the system administrator defines a set of priority groups based on report cost. For example, the user may decide to establish three groups:

1. Group A: Report cost between 0 and 40;
2. Group B: Report cost between 41 and 80; and
3. Group C: Report cost between 81 and 100.

As a result, it should be appreciated that the set of cost groupings cover each possible cost value from 0 to 100, for example.

As shown above in FIG. 12, the relevant user groups are selected in step 745. That is, if user was selected as one of the relevant priority variables, the system administrator, or other appropriate person, selects the defined user groups that will be relevant for establishing priority. It should be noted that all user groups defined on the system may not be appropriate for defining priority. That is, the system administrator will select only those groups that need to be considered for establishing priority. Further in accordance with one embodiment, the interface might also force the user to include an "all other" user group. This catch all will ensure that any user who submits a job will belong to at least one group that is used in determining priority.

Further, it is also possible for a job to be submitted by a user who belongs to more than one group. In this situation, there could be a conflict in the priority assigned to a job. Accordingly, the priority function should assign the highest possible priority to a job if the associated user could be considered a member of more than one user group.

As shown in step 750 of FIG. 12, the combinations are mapped into queues. That is, once priority variables have been selected, the system administrator maps all possible priority combinations to the available queues. Depending on the chosen priority variables, the user should see a list of projects, a list of user groups, and a list of cost groups. The user should, in accordance with embodiments of the methods and systems of the invention, be able to select combinations of these variables and associate them with the available queues. Further, each combination is assigned a queue.

In step 760 of FIG. 12, each queue is grouped into queue sets. At this point, the prioritization scheme is defined and the system administrator, or other appropriate person, is ready to define the servicing scheme for the available queues. The system administrator may choose to group queues into queue sets in order to apply a different servicing policy at the queue set level than at the queue level. The user may group the available queues into any number of queue sets, but queue sets may not be further grouped together.

In step 770, as shown in FIG. 12, the servicing schemes are defined. It should be noted that regardless of whether the system administrator has one or two levels in the queue structure, she may now define the thread service policy for each queue set. The user should see the available queues and the available processing threads, i.e., the database connections, that will serve those queues. All database connections may be associated to one of the available queue sets in accordance with embodiments of the methods and systems of the invention.

Accordingly, the system administrator defines the servicing policy within each queue set. For each queue set, the system administrator should select one of these servicing schemes defined above including fixed thread—selfish, fixed thread—cooperative, highest priority first, or waited share, for example, or another desired servicing scheme. Depending on the selection, the user also specifies relevant parameters to define the servicing scheme.

For example, in the fixed thread—selfish scheme, the user specifies the number of threads dedicated to each queue. For the fixed thread—cooperative scheme, the user specifies the number of threads dedicated to each queue. For the highest priority first scheme, no additional parameters are required. Lastly, for the waited share scheme, the user defines a weighting factor for each queue. Illustratively, the weighting factors should be specified as integers between 0 and 255.

In accordance with one embodiment, the system administrator should be able to manually change the priority of a particular job. That is, while a job is still in a query execution queue, the system administrator should have the ability to change its priority. Further, additional variations may be utilized further to the systems and methods described above. For example, the system 100 may provide the ability to configure different prioritization and servicing schemes for different pools of database connections. Further, the system 100 might provide that the prioritization functions change via a schedule, for example, change between working hours and off-working hours. Further, the service policies might change via a schedule.

It should be appreciated that a queue or a queue set need not be defined based on priority assigned to a job. Rather, queue sets could be defined based on other characteristics. For example, one or more queue sets may be created, wherein each queue set may be defined based on one or more queue set factors. The queue set factors may include one or more of a range of priority values, or any of a variety of other queue set factors, as may be desired.

It should be appreciated that the systems and methods of the invention are described above using the arrangement of a queue set, which contains multiple queues. However, the various features and concepts, i.e., the various priority and servicing schemes, described above dealing with the processing and manipulation of queue sets may also be applied to queues, whether such queues are in a queue set, or alternatively, not in a queue set. Further, the various features and concepts described above dealing with the processing and manipulation of queues, which are in a queue set, may also be applied to queues which are not disposed in a queue set.

In other words, the teachings above dealing with a queue set may be applied to queue. Further, as used herein, a "queue set" may be thought of and characterized as a queue. In a similar manner, what is described above as a "queue" might be thought of and characterized as a "sub-queue." Thus, a plurality of sub-queues may be disposed in a queue in the same manner as a plurality of queues are disposed in a queue set above, and further, such a queue/sub-queue arrangement may utilize the features and concepts described above, i.e., that were described for a queue set/queue arrangement. Further, it should be appreciated that the systems and methods of the invention may also be extended to further sub-sets of queues, i.e., a queue that contains a sub-queue, which in turn contains a sub-sub-queue. Accordingly, the systems and methods of the invention provide a wide variety of techniques to prioritize jobs, whether those jobs are disposed in a queue set, a queue, a sub-queue, or a sub-sub-queue.

B. Systems and Methods for Command Line Interface

In accordance with one embodiment of the systems and methods of the invention, a command manager, which is a tool, may be utilized to facilitate the performance of certain administrator tasks. These command manager capabilities allow additions, deletions, or updates to enterprise—level data associated with the large numbers of users and user groups. The command manager provides various functions and capabilities related to the command manager graphical user interface (GUI), the command manager executor, i.e., the tools asynchronous processing function set, and capabilities available through the command line. In further explanation, the system and method of the invention provides a command line which is a console whereby a user may type in text commands directly to a server. Such text commands provide the ability to form various administrative tasks easily and effectively. For example, administrative tasks that are repetitive, such as creating a user on the system, or alternatively, tasks that are performed in bulk are performed more easily than utilizing conventional techniques. In accordance with one embodiment of the invention, a text script is created and stored in a text file. The text file may be changed utilizing copying and pasting techniques within that text file, for example. This text file may be saved and utilized in bulk operations. Thereafter, the entire text file may be submitted to a command line processor all at once. As a result, the systems and methods of the invention provide a technique for easily performing tasks in bulk.

It should be appreciated that an end user will commonly ask the processor a wide variety of questions and interface with the system in a manner which is very interactive. In contrast, an administrative user who is supporting the system often desires to do tasks in bulk and as quickly as possible. Illustratively, an administrative user may wish to create a substantial number of users, change a substantial number of users passwords, or adjust a wide variety of administrative settings, for example.

Hereinafter further aspects of the system and method of the invention will be described. Further, it should be appreciated that various aspects of the invention relating to the command line interface are described in Attachment B, which is attached hereto and made a part hereof.

Figure 13:
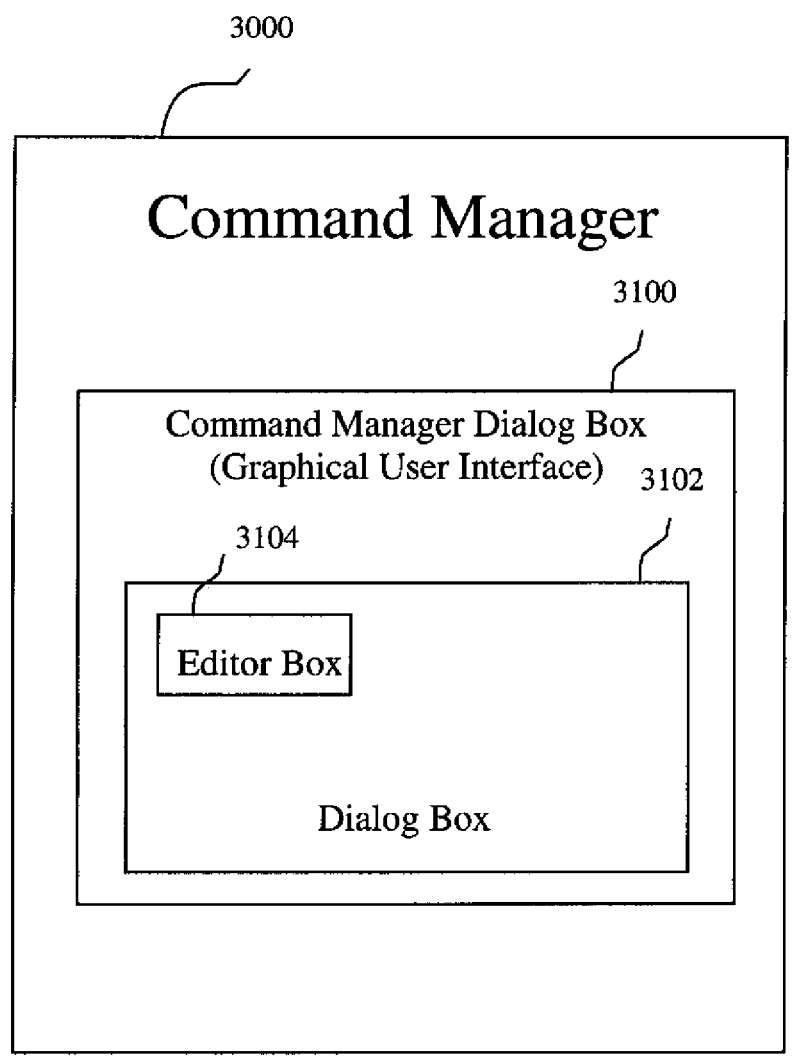
FIG. 13 is a block diagram showing a command manager, which includes a command manager graphical user interface (GUI) according to an embodiment of the invention.

FIG. 13 is a block diagram of a command manager 3000. The command manager 3000 includes a command manager graphical user interface (GUI) 3100. The interface 3100 provides access to various capabilities in accordance with embodiments of the system and method of the invention. The interface 3100 may be provided with a manager dialog window. The dialog window may include a dialog box 3102 in which a user can display command manager outlines, create and edit command scripts, view the results of submitted scripts, and/or view status messages relating to existing scripts. Further, the command manager dialog window may include a menu bar to access command manager functionality as menu options. Further, a tool bar is provided in the command manager dialog window to access certain capabilities directly through associated icons. Hereinafter, various command manager functions available on the primary window will be described.

The command manager dialog box 3102 includes a data display area and a set of associated tabs that are used to extend the options available. The data display area may be arranged in any suitable manner. Illustratively, the data display area is organized such that in the upper portion of the window there is an editor box 3104 that serves to display command outlines and modify associated scripts. In the lower portion of the window there is an area to display the results of submitted scripts and status messages. Associated with this display area are various tabs. Illustratively, these tabs may include results, messages, and a script tab. The results tab is located in the bottom-left portion of the window in accordance with one embodiment. Once selected, the results tab displays results associated with the current command script.

Additionally, there is a messages tab. The messages tab may be located in the bottom-left portion of the window. Once selected, the messages tab displays the status of the current command script.

Further, there is a script tab. Illustratively, the script tab may be located in the upper-left corner of the window. The script tab identifies the command script being currently edited.

As described above, there is provided an editor box 3104 that serves to display command outlines. The outline is the shell within which the script for a set of command instructions is developed.

The command manager menu bar includes, in addition to standard operating system options, items unique to the tool in accordance with the system and method of the invention. For example, the menu items may include connect, disconnect, disconnect all, last five connections, execute, results, reconnect, connection information, and options. These options may be presented to a user in any suitable manner such as using file, connection and a tools option. That is, a user would select "file" to view the options connect, disconnect, disconnect all and last five connections.

Illustratively, a menu item "connect" displays the login dialog box to open a new connection to a project source name. Descriptions of the additional menu items are provided in Attachment B.

In accordance with further aspects of the methods and system of the invention, the options dialog box, available from tools on the menu bar, includes two tabs, general and results. Together, these two tabs provide a number of choices regarding the placement and format of command outlines, scripts, and script results. For example, the contents of this dialog box may include a script file directory, outlines file directory, results file directory, script file extension, outline file extension, results file extension, enable history checkbox, and maximum history count window. Such tab contents may be provided under the tab general. Further, a default results target selection may be provided under a "results" tab.

Illustratively, the choice "script" file directory under the tab "general" allows selection of a directory in which to store each script. Further, an "outlines file directory" choice allows selection of a directory in which to store the folder containing command manager outlines. Further features of the tab, tab contents and function are described in Attachment B.

In accordance with systems and methods of the invention, the tool bar as described above provides various options. Specifically, options directly accessible from the tool bar include various command manager—specific functions including insert outline (displays a command outline on the command manager dialog box); clear window (discards the current content of the dialog box); execute (runs the current script); stop (stop script execution); check syntax (validates the content of a selected script); reconnect (refreshes the current project source connection); history combination—box (displays the history of scripts submitted during a given session); and clear history (discards history when the current session is terminated.

Hereinafter further aspects of the command manager graphical user interface (GUI) tools will be described. The interface 3100 includes a login dialog box. The login is the first dialog box displayed when a user enters the command manager environment. The login allows a user to use command manager functions when the user provides the information necessary to access the tool. Various data may be required to be entered by the user. For example, this data may include project source name, user name, and/or a valid password. Once the user has provided the information requested, the command manager displays the primary command manager dialog box. Thereafter, the user begins using the tool. It should be appreciated that from the login dialog box, a user may establish multiple, simultaneous connections, either to one project source name or to multiple project source names.

It should be appreciated that the command manager provides outlines to a user. The outlines provided by the command manager facilitate the creation and submission of command—based instructions by providing the syntax necessary for a desired purpose.

As should be appreciated, various protocols may be utilized in conjunction with the command manager outlines. Illustratively, this protocol may include that all outlines are kept in a specific folder, in a specific location; the initial location and extension of the folder containing outlines or default values provided by the system; the location and extension of the command—outline folder can be modified by using options, under tools, under a suitable menu bar; and multiple scripts can be created from any one outline.

Further, it should be appreciated that a history feature may be provided by the command manager 3000. The history feature allows a user to save each set of instructions executed successfully. In accordance with one embodiment of the invention, the history feature does not differentiate content data by project source connection. Rather, data is presented for multiple connections on the same display. Further, a user may select which instruction it sets to save by enabling or dis-enabling the history feature. Also, through options on a suitable menu, a user may select the number of instruction sets the feature is to save. Once selected, command script history is saved independently of whether the tool is subsequently turned off.

As described above, various front-end features may be utilized in accordance with embodiments of the invention. Hereinafter, additional features relating to the back-end processing in accordance with embodiments of the invention will be described. In accordance with one embodiment, the command manager executor controls the back-end process that runs asynchronously when the system executes a set of instructions. The asynchronous capability of the executor allows a user to either submit multiple independent scripts (using multiple connections) or work on multiple applications.

The systems and methods of the invention provide various object-handling capabilities. That is, instructions are submitted to the executor in the form of scripts. Scripts provide the means to manipulate a distinct set of objects. Various object-related actions may be requested through these instructions. For example, one object may relate to a user. The instructions provided by this object may include create user, alter user, delete user, add user to group, list user properties and/or list user privileges. Other objects, which are associated with corresponding instructions, include user group, security roll, security filter, DBLOGIN, DBConnection, connection mapping, privilege assignment, and miscellaneous. For example, a miscellaneous object may include instructions such as create user profiles, delete user profiles, list project properties and list projects. Further aspects of these object handling capabilities are described in Attachment B.

Hereinafter, further features of the invention relating to using the executor will be described, and specifically, features relating to the capabilities of the executor function. In accordance with embodiments of the invention, an independent instance of the executor is initiated each time a user submits a set of instructions for execution. Further, an executor instance expires when execution of the instruction set submitted is complete. Further comments should be appreciated that a user may submit instructions for execution in one of two ways. A user may submit instructions for execution by selecting data in the active script and clicking the execute icon on a tool bar, i.e., such that the system executes only the data selected. Alternatively, a user may submit instructions for execution by clicking a suitable command such as "execute," i.e., such that the system executes the entire script.

It should be appreciated that in accordance with one embodiment of the invention, the execution of an instruction set may be interrupted by a user. If a user interrupts execution of the instruction set, for example, by clicking a stop button on the "GUI" dialog box, the executor highlights the last instruction submitted, to facilitate continuation of the script when the task is resumed.

Further, it should be appreciated that once a script is submitted, the executor processes the instruction set asynchronously, thus providing a user with the option of working on another script on the same connection, opening another connection, or working on a different application.

It should be appreciated that various syntax-errors may be encountered during operations of the executor. In accordance with one embodiment of the systems and methods of the invention, the executor handles these syntax-errors using a series of operations. That is, when a user submits an instruction set, the executor verifies the syntax of each instruction before executing that instruction. Further, when the executor detects a syntax-error, the executor generates an error message that is displayed through the messages tab on the command manager GUI window. Simultaneously with the messages-tab display, the executor displays the portion of the instruction set where the error was detected, and highlights the text effected.

Further, execution errors may be encountered in operations of the executor. In accordance with one embodiment of the method and system of the invention, when the executor detects an error during the execution of an instruction set, the executor sends an error message that is displayed through the messages tab on the command manager GUI window. If an execution error is critical, execution stops, and the instruction that could not be executed is highlighted on the display window.

Alternatively, it should be appreciated that the detected error may not be critical. If the error detected is not critical, then execution either omits the instruction or completes whatever portion of the instruction is correct.

Hereinafter, further features relating to the command line will be described. In accordance with one embodiment of the system and method of the invention, the command manager provides the option to create, modify and submit scripts directly from the command line. Illustratively, Attachment B sets forth exemplary syntax for creating and modifying scripts using the command line. Hereinafter, in accordance with embodiments of the method and system of the invention, further aspects of the command manager's syntax will be described. That is, features relating to the command manager's script syntax will be described including notation rules, reserved words, and specific definitions. Hereinafter, various terminology and notation rules (used when creating or modifying command manager scripts) will be described, in accordance with one embodiment of the invention. As used herein, a "token" is a word, list of words, or symbol recognized by a parser as an individual unit with a specific meaning. For example, tokens can be reserved words, identifiers, numbers in any notation, symbols, or other special characters such as carriage returns. Some tokens may be optional. Further, some tokens may be exclusive options, i.e., only one of the tokens should be used in a statement. Further, illustratively, tokens may be provided to indicate that such tokens are identifiers provided by the user as parameters; their use may have additional restrictions.

Hereinafter, further aspects of each statement will be described. Each statement includes a title and three sections. The first section provides a brief description of the statement's function. The second section contains the statement's syntax. The third section describes included tokens not in a reserved-word list, in their associated restrictions. In accordance with one embodiment, reserved words in a statement may appear in all uppercase.

It should be appreciated that a wide variety of words may be "reserved words." The reserved words may pertain to commands, objects, object properties, privileges, values, or connectors, for example. For example, words that pertain to "commands" may include add, alter, apply, create, delete, or grant, for example. Further examples of reserved words are shown in Attachment B.

Hereinafter, further aspects of the statement syntax will be described. Attachment B provides various descriptions that describe the details of command manager statement syntax. As shown in Attachment B, statement descriptions are grouped according to the type of object manipulated. Each statement description is associated with an explanation of the parameters involved. Various categories may be provided including user manipulation, user group manipulation, security role manipulation, security filter manipulation, DBLOGIN manipulation, DBConnection manipulation, connection mapping manipulation, assignation of privileges, user connection management, system management, as well as miscellaneous. For example, the user manipulation category may include a "create user statement" statement.

C. Systems and Methods for Security Aware Caching

In accordance with embodiments of the system and methods of the invention, various caching techniques may be utilized. The caching techniques described herein enhance the speed of operations in a server through utilizing various performance enhancement features.

It should be appreciated that a shortcoming of existing caching techniques is that such existing caching techniques do not effectively address security concerns. In accordance with the invention, the caching techniques utilize various security features, while still providing the benefits of caching. As a result, in the systems and methods of the invention, even while the caching is capturing the desired data, the integrity of the security is maintained. That is, while the processing is efficiently sped up, the integrity of the security that has been established is maintained. This feature of the invention is in contrast to existing caching techniques in which caching is traded for security considerations.

In accordance with the systems and methods of the invention, there are three layers of security. These three layers include data security, application security, and presentation security.

Data security may be provided to protect the data. It should be appreciated that data security may be provided by existing systems such as Oracle™ database system. The data security, in accordance with embodiments of the methods and systems of the invention, is designed to protect the data and ensure that users have access to data that such users are supposed to be able to see.

In accordance with the systems and methods of the invention, there is a further data construct. This further data construct may be characterized as a "security filter." The security filter also ensures that users see the data which they are supposed to see. Such a dual data security arrangement is beneficial in that security measurements may be established either in the database, or alternatively, in a desired system utilizing the methods of the invention, whichever is easier and appropriate.

Further, the systems and methods of the invention provide application security. The application security addresses whether a user has access to a particular question that another user has asked. That is, application security does not address whether a user has access to the results of another user's question, but whether a user has access to the question of another user itself. That is, can a user share the questions that that user has asked and saved in the system with other people. Are those other people allowed to change those questions relates to "object security."

Hereinafter, various features of report caching will be described in accordance with embodiments of the systems and methods of the invention. Additional features of report caching are described in Attachment C, which is attached hereto and made a part hereof. In accordance with features of the invention, report caching can persist a report instance to cache its results. Further, a report can be designed based on the results of another report. Such report will be a "subset" report, meaning that the data (of such a subset report) will be a subset of the report upon which the subset report is based. That is, the report is based on a "base" report of the "subset report."

Additionally, in accordance with embodiments of the systems and methods of the invention, when a subset report is executed, a cache hit will take place if the base report is in the cache. An analytical engine can create a view of the results from the base report result set. Further, object browsing interfaces are supported by the report instance to facilitate report building.

In accordance with the embodiments of the invention, a "base report" is utilized. That is, during the report creation process, a user can use an existing report as the base for a new report. The existing report is called a "base report" of the new report. The new report is called a "subset report" of the "base report."

As used herein, a "subset report" is utilized. A subset report is a report whose definition is based on the definition of another report. A subset report is rooted in the fact that the result for the new report is a subset of the results for the original report.

In accordance with embodiments of the invention, a "cached" report instance may be utilized. A cached report instance is an instance of a report in which a report serving caching mechanism caches the results.

In accordance with embodiments of the invention, a "template subset" may be utilized. That is, the template of a subset report is a subset of the template used for the base report. The attributes and matrix that a user can choose to display as part of the new report belongs to the set of attributes in matrix present in the template of the base report, in accordance with one embodiment of the methods and systems of the invention.

In accordance with embodiments of the invention, a "filter subset" may be utilized. The user can only define a filter for the subset report based on the elements, matrix and attributes that are present in the base report. The evaluation of the filter will be applied on the base report result set.

In accordance with embodiments of the methods and systems of the invention and as described above, a subset report requirement may be utilized. That is, a subset report can be seen as a subset of the base report. The subsetting calculation may include various features. Illustratively, there may be a security filter subset. In accordance with one embodiment of the methods and systems of the invention, a user does not specify any security subset filter. Whether, the security filter applies automatically to the subset report based on the base report.

Further, there may be an additional filter subset. This may include applying the filter on the base report result set. Types of filters may include metric, qualification or ranking, for example.

Further, there may be a template subset. A template subset may be pre-specified in the subset report definition, or prompt to the user at run time.

Figure 14:
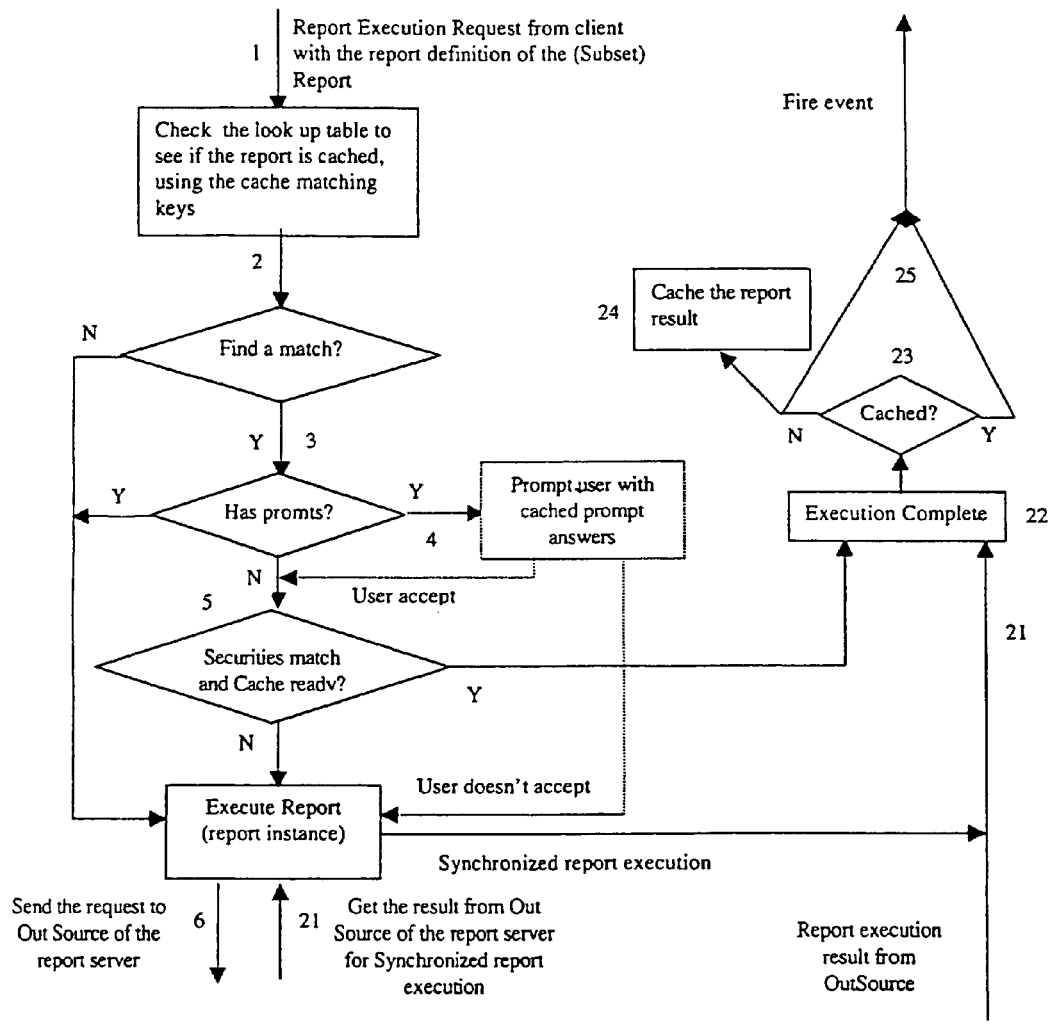
FIG. 14 is a flowchart showing a process to utilize cache according to an embodiment of the invention.
Figure 15:
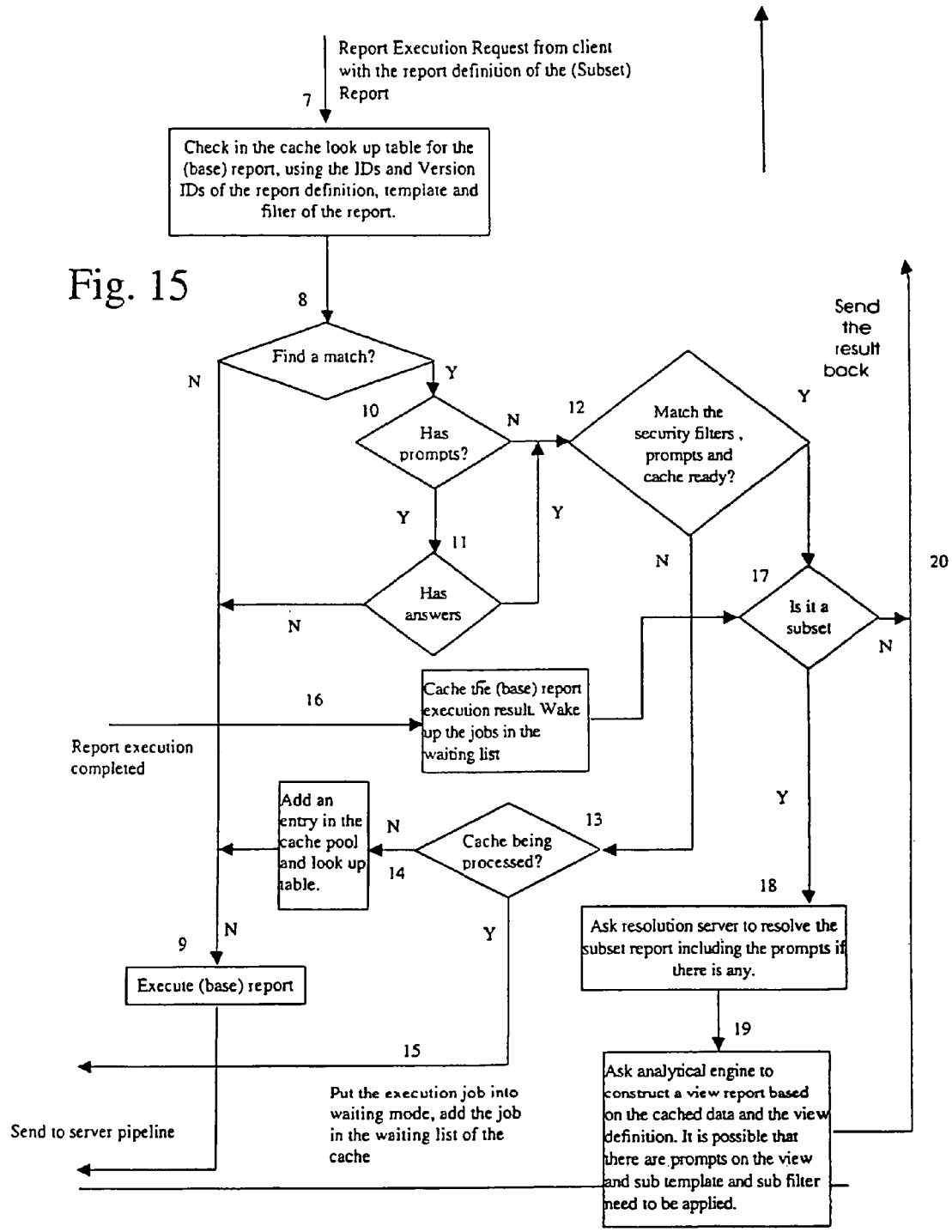
FIG. 15 is a flowchart showing further details of the process shown in FIG. 14 to utilize cache according to an embodiment of the invention.

Hereinafter further features of the report caching will be described with reference to FIGS. 14 and 15. FIGS. 14 and 15 provide the cache related execution flow of a successful report execution. FIG. 14 and FIG. 15 provides an explanation of the high level logic used when creating, hitting and updating a cache. However, it should be appreciated that variations of the flow chart should be apparent to one of ordinary skill in the art, as is desired.

In step 1 as shown in FIG. 14, the report execution request is sent to a report server with the definition of the (subset) report, i.e., on the client side. Then in Step 2, the report server reconstructs a report instance with the report definition and calls the execution helper function which asks the cache manager to look up for the cache of the report using the IDs and version IDs of the report definition, template and filter. If there is a match, the process proceeds to Step 3. Otherwise, the process passes to Step 6.

In Step 3, the process checks if the report has prompts. If the report does have prompts, then the process passes to Step 6. Otherwise, the process passes to Step 5.

Step 4 illustrates an alternative design. In step 4, the process finds the most recently created cache that matches the securities and prompts the user with the cached answers to the prompt. If the user accepts the answers provided, then the process proceeds to Step 5. Otherwise, the process passes to Step 6.

In Step 5, the process checks if the security matches, as well as if the cache is ready. If yes, then the process fills the report instance with the cached report and returns to the report server. Then, the process passes to Step 23.

Alternatively, the process may have passed to Step 6. In Step 6, the report server asks its outsource to execute the report. It should be appreciated that the outsource of the report server is the report executor. In the situation of two-tier, the report executor will execute the report by making calls on the execution components created by the session. In a three-tier situation, the only available execution component is the analytical engine. If the report executor finds that it can't execute the report itself, it will again turn to its outsource, which is the report net client. Report net client will send the report execution request to the server side. In four-tier the report execution request will be sent to the server side directly.

Then, in Step 7 as shown in FIG. 15, the report source server unpacks the report instance from the message and passes the request to the report server on the server.

Then, in Step 8, the report server asks the cache manager to look up for the cache of report using the IDs and version IDs of the report definition, template and filter. If there is a match, then the process passes to Step 10. Otherwise, the process passes to Step 9.

In Step 9, the service manager creates a job and submits the job to the job executor in accordance with this embodiment of the systems and methods of the invention. Steps 10-15, as described below, might be characterized as "resolution," if the job has not been resolved. The process passes to Step 16 when the execution is completed.

Alternatively, the process passes to Step 10. In Step 10, the process checks to see if the report has prompt. If yes, then the process passes to Step 11. Alternatively, the process passes to Step 12. In Step 11, the process determines whether the report instance already has a prompt answer in it. If yes, then the process passes to Step 12. Otherwise, the process passes to Step 9.

In Step 12, the process checks to see if the security filters match, prompt answers match (if any) and the cache is ready. If yes, then the cache manager fills the instance with the cached report, and records cache hitting and other statistic data. If these checks are confirmed, then the process passes to Step 17. Otherwise, the process passes to Step 13.

In Step 13, a determination is made if the checking in Step 12 failed because the cash is being processed. If so, the process passes to Step 15. Otherwise, the process passes to Step 14. In Step 14, the process adds an entry for the report in the cache look-up table and cache pool. Then, the process passes to Step 9.

Alternatively, in Step 13 the process may have passed to Step 15. In Step 15, the process sets the status of the executing job to be waiting and adds the job in the waiting list of the cache.

In Step 16 as shown in FIG. 15, the report execution is completed (following Step 9). That is, the report server will get the cache manager and update the cache in the cache pool and update the entry in the look-up table. The report server will also wake up the jobs in the waiting list. After Step 16, the process passes to Step 17.

In Step 17, the process determines the type of the report. If the report is a subset report, then the process passes to Step 18. Otherwise, if the report is not a subset report, then the process passes to Step 20.

In Step 18, the process asks the resolution server to resolve the subset report including its prompts, if any, based on the base report result. Then, in Step 19, the analytical engine will construct a subset and Xtab on it to generate the view based on the base report instance, subset reports resolution object and subset report's definition. That is, the analytical engine is asked to construct a view report based on the cached data and the view definition. It is possible that there are prompts on the view and sub-template and sub-filter need to be applied.

As shown in FIG. 15, the last Step on the service side is sending the result back to the client. It should be appreciated that if a subset report is being processed, then it is not necessary to send the base report back to the client.

Then, in Step 21, when the report execution result is returned, if it is from the server, the report instance is unpacked from the message. Then, the process passes to Step 22. In Step 22, the process fires the "execution complete" event on the report server. Then, the process passes to Step 23. In Step 23, the report server checks if the "subset" report is cached. If not, then the process passes to Step 24. Otherwise, the process passes to Step 25.

In Step 24, the cache manager on the client side caches the report result. Alternatively, in Step 25, the report server will fire an event to send the result back to the client program.

Hereinafter, further aspects of cache management will be described in accordance with embodiments of the systems and methods of the invention. Specifically, it will be described how to match cache in further explanation of FIGS. 14 and 15. It should be appreciated that various requirements may be imposed in order to match cache. There may be a requirement to match the report ID, the template ID, the filter ID, as well as their version IDs.

On the client side, the subset report is cached. As a result, the report ID, the template ID, the filter ID and their version IDs of the (subset) report is used as part of the key to search for the cache.

On the server side, the (base) report is cached. As a result, the report ID, the template ID, filter ID, and their version IDs of the base report of a subset is used as part of the key to search for the cache. It should be appreciated that in the case where the report instance is created directly from a template and filter (without a report definition), a GUID-NULL may be used for both the report ID and its version ID.

In accordance with further aspects of the invention, the security filters and user ID are matched. On the client's side, the security filters of the (subset) report, must be identical to the cached report. On the server side, the security filters of the (base) report must be identical to the cached report. Further, it should be appreciated that if the match user ID setting in project reference is turned on, it may also be required to match the user ID, i.e., both client side and server side.

Additionally, a requirement may be imposed to match the answers to the prompts. Further aspects of such matching is described in Attachment C.

D. Systems and Methods for User Interface

In accordance with some embodiments of the systems and methods of the invention, various features and operations may be utilized relating to authentication of a user on the system as well as user management. Various aspects of such features and operations are described in Attachment D, which is attached hereto and made a part hereof. Further, features are described below relating to interfaces that are used to manage user and group definitions.

Figure 16:
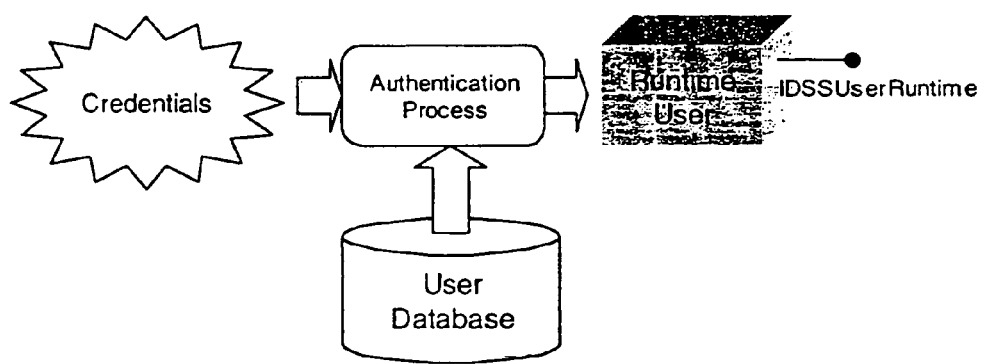
FIG. 16 is a flowchart showing an authentication process according to an embodiment of the invention.

In accordance with embodiments of the systems and methods of the invention, authentication is a process of identifying a user on the system 100. It should be appreciated that such identification is a first phase in any secure system. Successful authentication of a user grants that user the right to use the system 100. Without completing this first initial step, the system should prevent all access to such unauthorized users. FIG. 16 is a flow chart illustrating the process of authentication in accordance with one embodiment of the systems and methods of the invention. As shown in FIG. 16, the user supplies credentials which uniquely identify himself to the system. The authentication process utilizes a user database as shown in FIG. 16 to determine whether the supplied credentials are correct. If the supplied credentials are correct, then in accordance with the process of FIG. 16, the process produces a run time user object which embodies all the information required to securely access objects and use system services. The user object can be viewed as the key which unlocks some number of doors in the system 100.

Hereinafter, various authentication modes will be described. It should be appreciated that the exact type of credentials will determine what mode of authentication to perform. Illustratively, credentials may be accepted in a variety of forms. For example, user name and password may be utilized. When users supply these credentials, the system is employing what might be characterized as "standard security." The user name is an abbreviated name which is unique across the entire enterprise. The definition of these user names may be fully defined by the customer. These credentials may illustratively not be used to gain access to a relational database management system "RDBMS". The RDBMS credentials used by a particular user is hidden from normal view and fully controlled by an administrator, for example.

Alternatively, a windows NT identity may be utilized. Using this security option, the user need not supply any credentials, rather, the identity of the logged on user is all that is required.

Alternatively, a data warehouse login name and password may be utilized. That is, when the user wishes to supply their own RDBMS credentials, the data warehouse RDBMS is used to authenticate the user. If successful, the project and user login will uniquely identify the user. This process might be characterized as "pass through authentication."

Alternatively, custom credentials might be utilized as in authentication mode. Using custom credentials, a customer is allowed to provide their own form of "plug-in" authentication. In this case, the values for the login and password are not clear to the operators of the system, for example the administrator, but should be clear to the end-user. Illustratively, two text fields will suffice, i.e., including login and password. It should be appreciated that this last form of authentication would require a third-party install a component which performs authentication. The presence of this feature poses a security hole as the malicious user could insert his own security checker, which grants users with login name to map to the identity of an administrator or CEO. It should be appreciated that such breach of security may be difficult to detect.

Hereinafter, features relating to the access token functionality will be described. It should be appreciated that a user object must contain a secure data structure which defines the identify of the user and the type of access that user possesses. This may be characterized as the "access token." In accordance with one embodiment of the systems and methods of the invention, the safety of the system relies upon the fact that only the security subsystem has knowledge of the structure of this access token. If the structure of the access token was known and could be modified, it would allow the malicious user full access to the entire system.

Hereinafter, aspects relating to privileges will be described. When managing resources on a system, it is often difficult to identify access solely on a per-user basis. Rather, a system often grants access to an object in larger units, such as a group of users. This eases the burden not only by providing a shorthand notation, but also introduces a dynamic semantic. User membership, i.e., in groups, may change over time, which implies a corresponding (automatic) change to object access.

While the identify and group membership of the user is sufficient to determine whether that user has access to an existing object, it is insufficient in determining whether the user may create new objects of a certain type. It is also insufficient for describing whether the user may start or stop a DSS server or run DSS architect. For these reasons, the user object must possess a set of privileges. There are three types of privileges.

The first type of privilege is the "object creation privileges." This defines what project-level objects a user may create.

A second privilege is an application access privilege. This privilege defines what applications the user may interact with.

A third privilege is a system-level privilege. This type of privilege is the least defined group. That is, this privilege should define whether a user is allowed to back up the system or take ownership of any object. Illustratively, these may be independent of a specific object.

It should be appreciated that there may be a distinction between system privileges and project privileges. That is, before a user is connected to a project, the user possesses a set of privileges defined in the user database. After logging into a project, those privileges can be extended based on the roles the user performs in the project. The process for producing a new set of privileges with respect to a specific project is further described in Attachment D.

Hereinafter, features relating to "groups" will be described. A group is a collection of users and/or subgroups. Once created, a group can be specified in an access control list as a shorthand notation for a group of users. The groups may contain an arbitrated level of nested groups.

Within a user database, a predefined group may be provided called "everyone". This group will list all users defined in that database. This will ease the management of assigning global access rights.

In accordance with one embodiment of the system and method of the invention, a group will not be used to group privileges. The security role concept is how the system should manage the assignment of privileges. A group should be viewed as a mechanism for managing shared objects and controlling access to those shared objects. It should be appreciated that in accordance with one embodiment, groups and users should exist above the concept of a project. This allows separate authentication from project login.

Hereinafter, features relating to "security roles" will be described. It should be appreciated that a user may be viewed differently from project to project. As a result, the concept of a security role may be utilized. A security role may be comprised of a name, as well as a set of privileges. This provides a level of indirection for specifying privileges. It is analogous to how object access control is specified by using groups.

In accordance with one embodiment, a security role is defined global to all projects. However, each project will define which users belong to which security roles. A project may possess a role membership object to define which users can access the project and define what privileges they possess.

Construction of security roles may include the structure of creating a role, as well as adding roles that have more and more privileges. In creating a role, privileges may be provided which grant minimal access. This may include the special defined group, everyone, as discussed above, or an exclusive set of users in groups.

A strategy may be utilized to grant a minimal set of privileges system-wide and then enhance those privileges as you enter a project. Illustratively, the initial set of privileges may only include application access privileges in system wide operations.

Hereinafter, features relating to "authentication interfaces" will be described. In accordance with this aspect of the invention, authentication may be embedded inside a client connection model interface or interfaces. That is, when the client program is evaluating data sources, a user will be authenticated as part of the data source initialization function.

Authentication may fail for one of several reasons. For example, authentication may fail if the user supplied invalid credentials. Alternatively, authentication may fail if the user must change his password. Further, authentication may fail if the user is not admitted to a particular project. Further features relating to failure of authentication are described in Attachment D.

After successful authentication of a user object, the following steps may occur in accordance with some embodiments of the systems and methods of the invention. That is, the data source is initialized and a project object is retrieved. Then, the user object is checked against the project object to determine the user's role in the project and resolved privileges. Also, a step may occur in which access to the application is then checked. If the user has not been granted the privilege to use this application, the application should inform the user and promptly exit.

Accordingly, each of the above described steps may be completed successfully. If all these steps are completed successfully, the updated user object is then associated with the session object.

Hereinafter, further aspects relating to the user databases will be described. The user database is where DSS users and groups are stored. This type of database is called a resource-level metadata as it stores objects which exist outside the confines of a single project. Server-level objects, such as a server definition object, would reside there as well.

It should be appreciated that the existence of several user databases does not violate any assumptions in accordance with one embodiment of the invention. However, it should be appreciated that such arrangement does represent a potential for confusion among customers. Consider the problems of using different resource-level metadatas for the same project over time. That is, when an object is created, the current owner of the object is recorded. This is the user which created the object. Within a user database, the identification of a user is unique. Accordingly, if the resource-level metadata for that project is replaced, the owner of that object may initially not be allowed to login. If another account is created for that user, perhaps with the same login name, in the new resource-level metadata, there would still be no way to grant access to that new user, as the two user objects would be unrelated. Accordingly, the result is that the previously created object would become inaccessible.

In accordance with one embodiment of the systems and methods of the invention, a security subsystem may be provided to securely control the structure and integrity of an access token. The security subsystem may utilize a public/private key system to ensure that data exchanged between system components is securely encrypted and decrypted. Further features of authentication and user management are described in Attachment D, which is made a part hereof.

While the foregoing description includes many details and specifications, it is to be understood that these have been included for purposes of explanation only, and are not to be interpreted as limitations of the present invention. Many modifications to the embodiments described above can be made without departing from the spirit and scope of the invention, as is intended to be encompassed by the claims and their legal equivalents.

F. Attachments

In further explanation of the systems and methods of the invention in accordance with various embodiments, additional information is attached hereto and made a part hereof. This additional information includes:

Attachment A: Document entitled "Priority and Servicing" (pages 1-19); and Document entitled "DSS Server Priority" (Pages 1-12).

Attachment B: Document entitled "Appendix F—Microstrategy Command Manager" (Pages 341-352); and Document entitled "Appendix G—Command Manager Syntax" (pages 353-376)

Attachment C: Document entitled "Report Caching" (pages 1-24)

Attachment D: Document entitled "Authentication and User Management" (pages 1-22)

What is claimed is:

1. A method for facilitating the performance of administrator tasks in performing changes to enterprise level data that is associated with various users, the method comprising:
generating a login dialog box to accept login information from an administrator using a computer processor, wherein the login information received is used for authentication before a command may be executed;
receiving a request to connect to at least one project source name and establishing a connection to the at least one project source name based on the request;
in response to a user selection of at least one outline, providing the outline to the administrator via an editor box located at a data display area of a command manager dialog box, wherein the editor box serves to modify scripts developed for command based instructions in the outline, the command based instructions are for changes to enterprise level data that is associated with various users, the outline provides (i) syntax for the development of the scripts for the command based instructions, (ii) a shell for the development of the scripts for the command based instructions, and submits the command based instructions for execution, the outline being maintained in a predetermined folder;
displaying, with the outline, one or more results of the submitted command based instructions and one or more status messages related to the command based instructions;
compiling a business intelligence report based on the submitted command based instructions and one or more status messages, wherein the business intelligence report is generated based on assigned report priority values of normalized priority variables; and
providing a history feature to save a set of the command based instructions that were executed successfully for future presentation in a business intelligence reporting system.

2. The method of claim 1 wherein the command based instructions are provided via a command line interface.

3. The method of claim 1 wherein the command based instructions comprise adding, deleting, or updating the enterprise-level data associated with users or groups of users.

4. The method of claim 1 wherein the administrator tasks in performing the changes to the enterprise level data that is associated with various users are performed over the Internet.

5. A system for facilitating the performance of administrator tasks in performing changes to enterprise level data that is associated with various users, the system comprising:
a processor;
generation code for generating by the processor a login dialog box to accept login information from an administrator using a computer processor, and utilize the accepted login information for authentication before a command may be executed;
connection code for receiving by the processor a request to connect to at least one project source name and establishing a connection to the at least one project source name based on the request: an outline processor to, in response to a user selection of at least one outline, provide the outline to the administrator via an editor box located at a data display area of a command manager dialog box, wherein the editor box serves to modify scripts developed for command based instructions in the outline, the command based instructions are for changes to enterprise level data that is associated with various users, the outline provides (i) syntax for the development of the scripts for the command based instructions, (ii) a shell for the development of the scripts for the command based instructions, and submits the command based instructions for execution, the outline being maintained in a predetermined folder; and
history code for displaying, with the outline, one or more results of the submitted command based instructions and one or more status messages related to the command based instructions, compiling a business intelligence report based on the submitted command based instructions and one or more status messages, wherein the business intelligence report is generated based on assigned report priority values of normalized priority variables; and providing a history feature to save a set of the command based instructions that were executed successfully for future presentation in a business intelligence reporting system.

6. The system of claim 5 wherein the command based instructions are provided via a command line interface.

7. The system of claim 5 wherein the command based instructions comprise adding, deleting, or updating the enterprise-level data associated with users or groups of users.

8. The system of claim 5 wherein the administrator tasks in performing the changes to the enterprise level data that is associated with various users are performed over the Internet.

* * * * *

UNITED STATES PATENT AND TRADEMARK OFFICE
CERTIFICATE OF CORRECTION

| | | |
|---|---|---|
| PATENT NO. | : 8,522,192 B1 | Page 1 of 1 |
| APPLICATION NO. | : 10/175328 | |
| DATED | : August 27, 2013 | |
| INVENTOR(S) | : Avalos et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2690 days.

Signed and Sealed this
Second Day of June, 2015

Michelle K. Lee
*Director of the United States Patent and Trademark Office*